(12) United States Patent
Lau

(10) Patent No.: US 10,341,214 B2
(45) Date of Patent: *Jul. 2, 2019

(54) SCENARIO COVERAGE IN TEST GENERATION

(71) Applicant: CA, Inc., Islandia, NY (US)

(72) Inventor: Rich J. Lau, Deer Park, NY (US)

(73) Assignee: CA, Inc., Islandia, NY (US)

( * ) Notice: Subject to any disclaimer, the term of this patent is extended or adjusted under 35 U.S.C. 154(b) by 335 days.

This patent is subject to a terminal disclaimer.

(21) Appl. No.: 15/085,789

(22) Filed: Mar. 30, 2016

(65) Prior Publication Data

US 2017/0289008 A1    Oct. 5, 2017

(51) Int. Cl.
  *G06F 11/34*  (2006.01)
  *H04L 12/26*  (2006.01)
  *H04L 12/24*  (2006.01)

(52) U.S. Cl.
  CPC .......... *H04L 43/14* (2013.01); *G06F 11/3447* (2013.01); *G06F 11/3457* (2013.01); *H04L 43/50* (2013.01); *G06F 2201/865* (2013.01); *G06F 2201/87* (2013.01); *H04L 41/046* (2013.01)

(58) Field of Classification Search
  CPC ............. G06F 11/3447; G06F 11/3457; G06F 2201/87; G06F 2201/865
  See application file for complete search history.

(56) References Cited

U.S. PATENT DOCUMENTS

| | | | |
|---|---|---|---|
| 5,345,587 A | 9/1994 | Fehskens et al. |
| 5,450,586 A | 9/1995 | Kuzara et al. |
| 5,576,965 A | 11/1996 | Akasaka et al. |
| 6,122,627 A | 9/2000 | Carey et al. |
| 6,134,540 A | 10/2000 | Carey et al. |
| 6,810,368 B1 | 10/2004 | Pednault |
| 6,879,946 B2 | 4/2005 | Rong et al. |
| 6,883,162 B2 | 4/2005 | Jackson et al. |
| 6,957,199 B1 | 10/2005 | Fisher |
| 7,376,549 B2 | 5/2008 | Horikawa |
| 7,437,710 B2 | 10/2008 | Bau et al. |
| 7,487,508 B2 | 2/2009 | Fu et al. |
| 7,539,980 B1 | 5/2009 | Bailey et al. |
| 7,552,036 B2 | 6/2009 | Oslake et al. |

(Continued)

OTHER PUBLICATIONS

Wikipedia, "Mock Object," Sep. 23, 2008, printed May 31, 2009, http://en.wikipedia.org/wiki/Mock_object, pp. 1-5.

(Continued)

*Primary Examiner* — Jeong S Park
(74) *Attorney, Agent, or Firm* — Alliance IP, LLC

(57) ABSTRACT

Transaction data is generated during monitoring of a plurality of transactions in a system and a respective flow is determined, from the transaction data, for each of the plurality of transactions. Each of the determined flows involves participation of a respective subset of software components of the system. A plurality of sets of overlapping flows in the plurality of flows are determined and a particular one of the plurality of sets of overlapping flows is determined to correspond to a use scenario of the system. A measure of the degree to which a set of artifacts modeling the system corresponds to the use scenarios of the system is determined.

20 Claims, 15 Drawing Sheets

(56) References Cited

U.S. PATENT DOCUMENTS

| | | | |
|---|---|---|---|
| 7,676,538 | B2 | 3/2010 | Potter et al. |
| 7,783,613 | B2 | 8/2010 | Gupta et al. |
| 7,805,496 | B2 | 9/2010 | Aiber et al. |
| 7,873,594 | B2 | 1/2011 | Harada et al. |
| 7,966,183 | B1 | 6/2011 | Kryskow et al. |
| 8,060,864 | B1 | 11/2011 | Michelsen |
| 8,112,262 | B1 | 2/2012 | Michelsen |
| 8,538,740 | B2 | 9/2013 | Kumar et al. |
| 8,898,681 | B1 | 11/2014 | Acheff et al. |
| 8,935,573 | B2 | 1/2015 | Horsman et al. |
| 9,201,767 | B1 | 12/2015 | Tarlton et al. |
| 9,323,645 | B2 | 4/2016 | Michelsen |
| 9,531,609 | B2 | 12/2016 | Talot et al. |
| 2002/0010781 | A1 | 1/2002 | Tuatini |
| 2003/0055670 | A1 | 3/2003 | Kryskow et al. |
| 2003/0217162 | A1 | 11/2003 | Fu et al. |
| 2004/0078782 | A1 | 4/2004 | Clement et al. |
| 2004/0128259 | A1 | 7/2004 | Blakeley et al. |
| 2004/0162778 | A1 | 8/2004 | Kramer et al. |
| 2004/0230674 | A1 | 11/2004 | Pourheidari et al. |
| 2004/0243334 | A1 | 12/2004 | Wrigley et al. |
| 2004/0243338 | A1 | 12/2004 | Sabiers et al. |
| 2005/0027648 | A1 | 2/2005 | Knowles et al. |
| 2005/0063335 | A1 | 3/2005 | Shenfield et al. |
| 2005/0198401 | A1 | 9/2005 | Chron et al. |
| 2005/0289231 | A1 | 12/2005 | Harada et al. |
| 2006/0224375 | A1 | 10/2006 | Barnett et al. |
| 2006/0235675 | A1 | 10/2006 | Oslake et al. |
| 2007/0006177 | A1 | 1/2007 | Aiber et al. |
| 2007/0033442 | A1 | 2/2007 | Tillmann et al. |
| 2007/0073682 | A1 | 3/2007 | Adar et al. |
| 2007/0169003 | A1 | 7/2007 | Branda et al. |
| 2007/0261035 | A1 | 11/2007 | Duneau |
| 2007/0277158 | A1 | 11/2007 | Li et al. |
| 2008/0010074 | A1 | 1/2008 | Brunswig et al. |
| 2008/0120129 | A1 | 5/2008 | Seubert et al. |
| 2008/0127093 | A1 | 5/2008 | Fernandez-Ivern et al. |
| 2008/0221941 | A1* | 9/2008 | Cherkasova ............ G06F 9/505 |
| | | | 718/106 |
| 2009/0064149 | A1 | 3/2009 | Singh et al. |
| 2009/0094684 | A1 | 4/2009 | Chinnusamy et al. |
| 2009/0119301 | A1 | 5/2009 | Cherkasova et al. |
| 2009/0187534 | A1 | 7/2009 | Broll et al. |
| 2009/0204669 | A1 | 8/2009 | Allan |
| 2009/0234710 | A1 | 9/2009 | Hassine et al. |
| 2009/0282403 | A1 | 11/2009 | Poole et al. |
| 2009/0298458 | A1 | 12/2009 | Bakker et al. |
| 2010/0037100 | A1 | 2/2010 | Lopian |
| 2010/0145962 | A1 | 6/2010 | Chen et al. |
| 2010/0318974 | A1 | 12/2010 | Hrastnik et al. |
| 2012/0059868 | A1 | 3/2012 | Buckl et al. |
| 2012/0084754 | A1 | 4/2012 | Ziegler et al. |
| 2012/0096444 | A1* | 4/2012 | Wright ................ G06F 8/433 |
| | | | 717/137 |
| 2014/0108589 | A1 | 4/2014 | Dhanda |
| 2014/0223418 | A1* | 8/2014 | Michelsen .......... G06F 11/3668 |
| | | | 717/135 |
| 2015/0205699 | A1 | 7/2015 | Michelsen |
| 2015/0205700 | A1 | 7/2015 | Michelsen |
| 2015/0205701 | A1 | 7/2015 | Michelsen |
| 2015/0205702 | A1 | 7/2015 | Michelsen |
| 2015/0205703 | A1* | 7/2015 | Michelsen .......... G06F 11/3688 |
| | | | 717/135 |
| 2015/0205708 | A1 | 7/2015 | Michelsen |
| 2015/0205712 | A1 | 7/2015 | Michelsen |
| 2015/0205713 | A1 | 7/2015 | Michelsen |
| 2016/0125052 | A1 | 5/2016 | Dahan et al. |
| 2016/0239409 | A1 | 8/2016 | de Oliveira Staudt et al. |
| 2017/0075799 | A1* | 3/2017 | Lau ........................ H04L 67/10 |

OTHER PUBLICATIONS

Lisa, 2.0 User's Guide, Interactive TKO, Feb. 27, 2003, pp. 1-130.
Lisa, 2.0 Developer's Guide, Interactive TKO, Mar. 13, 2003, pp. 1-23.
Chapter 5—Service Discovery, Bluetooth Application Developer's Guide, 2002 (pp. 167-209).
Chatterjee, S., "Messaging Patterns in Service-Oriented Architecture, Part 1," msdn.microsoft.com/en-us/library/aa480027.aspx, Apr. 2004, (pp. 1-21).
Time to live—Wikipedia, the free encyclopedia; 2015; pp. 1-3. http://en.wikipedia.org/wikiiTime_to_live>, examiner annotated document.
Web Discussion: "Is TCP protocol stateless or not?" available online at "http://stackoverflow.com/questions/19899236/is-tcp-protocol-statelessor-not" pp. 1-3 (2013).

* cited by examiner

SCENARIO COVERAGE IN TEST GENERATION

BACKGROUND

The present disclosure relates in general to the field of computer systems analysis, and more specifically, to automatically inspecting computer software system architecture.

Modern distributed software systems can enable transactions that cross system and network boundaries, with backend systems communicating with additional backend systems to generate results or provide a service for a client. As an example, online travel reservation systems often involve a frontend website with which users interact on their browser. To search for and complete a reservation in response to a user's request, the host of the travel reservation site may interact with other backend services, including services and systems provided by third parties, such as airlines, car rental companies, hotel companies, credit card payment systems, and so on. These third party services may, themselves, also communicate with and consume services of still further systems, resulting in a chain of transactions and dependencies in response to a single user's request. Additionally, each system itself may be composed of multiple different sub-systems, or components, that interact with each other (and even other systems) in different ways depending on the transaction.

While the breadth and sophistication of the services provided by distributed systems continues to expand and enrich users' lives, the complexity of these systems, their components, and their interoperation also increases. Indeed, it is not uncommon for multiple different enterprises and their systems to be involved in a single transaction. Even within transaction performed by a single entity's system, the multiple composite components of that system are often developed by and "owned" by distinct development teams, with few if any developers or administrators having an in-depth global knowledge of the system and all of its composite parts. This can pose a challenge to developers and administrators as they seek to modify, update, test, verify, and develop components for such software systems.

BRIEF SUMMARY

According to one aspect of the present disclosure, transaction data may be generated during monitoring of a plurality of transactions in a system and a respective flow may be determined, from the transaction data, for each of the plurality of transactions. Each of the determined flows may involve participation of a respective subset of software components of the system. A plurality of sets of overlapping flows in the plurality of flows may be determined and a particular one of the plurality of sets of overlapping flows may be determined to correspond to a use scenario of the system. A measure of the degree to which a set of artifacts modeling the system corresponds to the use scenarios of the system may be determined.

BRIEF DESCRIPTION OF THE DRAWINGS

Like reference numbers and designations in the various drawings indicate like elements.

DETAILED DESCRIPTION

Figure 1:
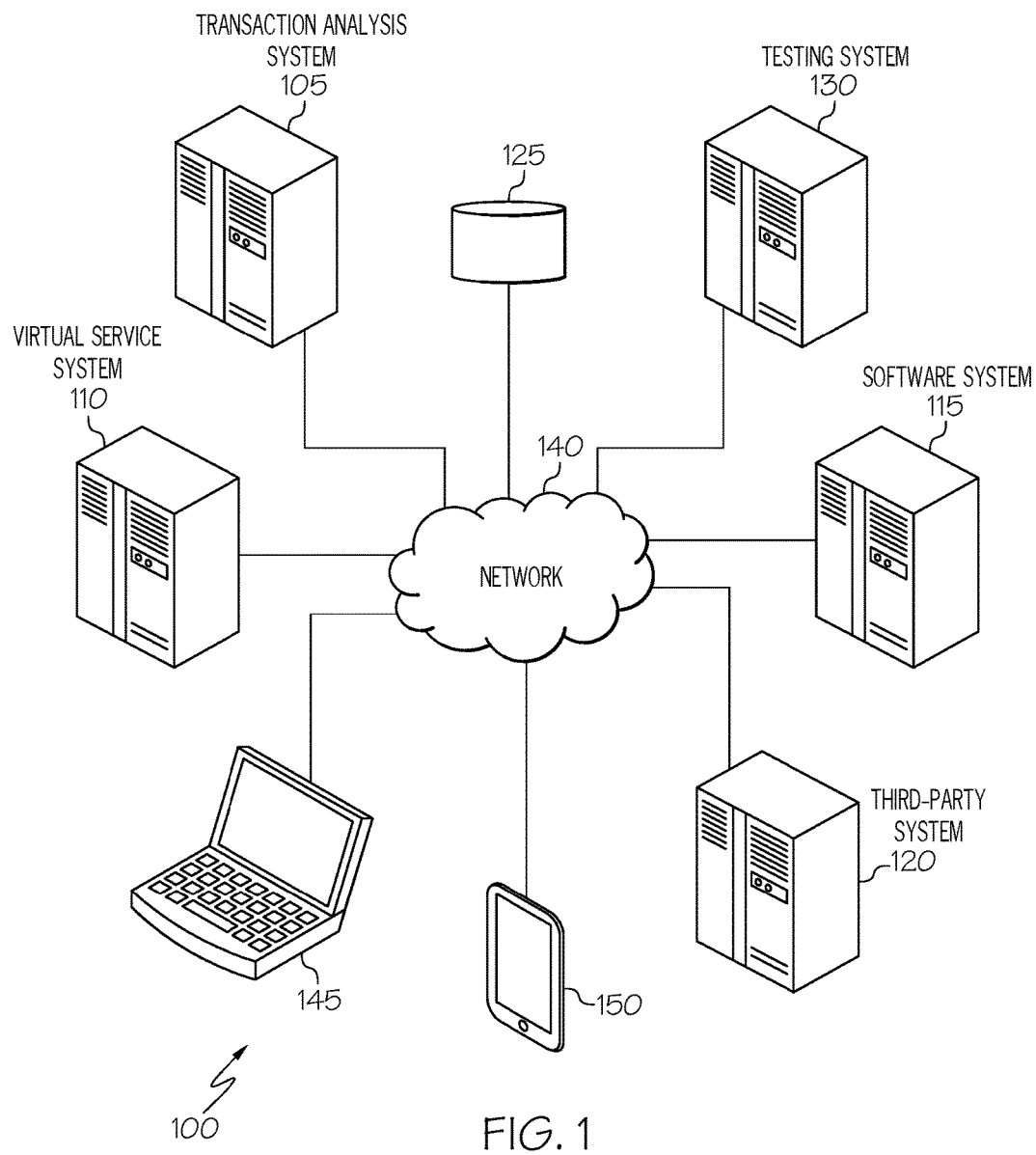
FIG. 1 is a simplified schematic diagram of an example computing system including an example transaction analysis system in accordance with at least one embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring now to FIG. 1, a simplified block diagram is shown illustrating an example computing system 100 including a transaction analysis system 105, virtual service system 110, testing system 130, among other hardware and software computing systems. In some implementations, functionality of the transaction analysis system 105, virtual service system 110, testing system 130, can be combined or even further divided and implemented among multiple different systems. Transaction analysis system 105 can include logic and functionality, implemented in software and/or hardware, for monitoring software transactions involving multiple different software components interacting within the transactions. The transaction analysis system 105 can sort transaction data generated from this monitoring and assess the transaction data to determine transaction fragments for each transaction. Each transaction fragment can include an interaction between two different software components within the transaction and include a request by one software component and a corresponding response to the request by the other. The software components can be components of the same or different application, can be hosted on the same machine, in different machines within a local network, or different remote machines on a wide area network. Each transaction can include multiple transaction fragments. The transaction analysis system 105 can determine, from the transaction data, the ordering of the composite fragments of each transaction as well as the flow of each transaction (e.g., how the transaction proceeds from component to component until completion, as well as the potential alternative paths of the transaction (e.g., according to various decision points within the transaction)). A graphical representation of the transaction, its flow, and the components involved in the transaction can be generated. Further, in this particular example, transaction analysis system 105 can also include logic for determining overlaps between transaction flows of multiple different transactions. The overlaps can be used to identify those flows that are most common within a given software system or application. These common flows can map to common use scenarios, or simply "scenarios," of the software system or application by a user or client system.

A testing system 130 can include functionality for simulating a client system's requests of a system or application under test. These simulations can include simulated requests or inputs to the application under test. Such simulated inputs can be based on models, or test cases, modeling various user inputs. In one implementation, determining common or popular use scenarios of an application can be utilized to form the basis of test cases developed for tests of the corresponding application. A scenario coverage measure can be determined that indicates the percentage of determined scenarios for which a test case has been generated. The scenario coverage measure can serve as a progress or testing quality indicator, as scenarios can be considered a proxy for the key transactions and transaction flows supported by a given software system.

In some instances, transaction data and transaction flow data generated by transaction analysis system 105 can be used in other systems. For instance, some software systems (e.g., 110, 115) can utilize, consume data and services of, provide data or services to, or otherwise be at least partially dependent on or function in association with one or more other computing systems, including third party computing systems (e.g., 120), or data stores, such as database 125, among other examples. Further, virtual service models can be generated from captured transaction data that simulate the actions of other systems and software components with which a system under test (e.g., 115) interacts. For instance, a test can be developed for execution by testing system 130 that can make use of virtualized instances (or models) of a third party system (e.g., 120), database (e.g., 125), or other systems and system components, including local system components. These virtualized instances can stand-in for and simulate actions and communication of the corresponding real world components and can interact with the system under test, among other examples. Further, scenario coverage can also indicate which dependencies should be virtualized and an additional scenario coverage measure can be determined to indicate which percentage of these dependent systems utilized in the determined scenarios have corresponding virtual service models, among other examples.

One or more computing systems and services can be hosted on machines communicatively coupled by one or more networks (e.g., 140), including local networks, public networks, wide area networks, broadband cellular networks, the Internet, and the like. Systems with which a system (e.g., 115) under test, development, used in training, etc. can interact can include other data stores (e.g., 125), systems (e.g., 120), and constituent software components accessible over the one or more networks 140. Further, systems and services (e.g., 105, 110, 130, etc.) provided to assess, test, and simulate one or more of systems 115, 120, 125, etc. can also be provided local to or remote from (e.g., over network 140) the target systems, among other examples. Additionally, computing environment 100 can include one or more user devices (e.g., 145, 150) that can allow users to interact with one or more of the servers, services, data structures, and services (e.g., 105, 110, 115, 120, 125, 130, etc.) provided, for instance, remotely over network 140, or at least partially local to the user devices (e.g., 145, 150), among other examples.

In general, "servers," "clients," "computing devices," "network elements," "hosts," "system-type system entities," "user devices," and "systems" (e.g., 105, 120, 125, 130, 145, 150, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices (e.g., 105, 120, 125, 130, 145, 150, etc.) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, a transaction analysis system 105, virtual service system 110, system under test (e.g., 115) or other sub-system of computing environment 100 can be at least partially (or wholly) cloud-implemented, web-based, or distributed to remotely host, serve, or otherwise manage data, software services and applications interfacing, coordinating with, dependent on, or used by other services and devices in environment 100. In some instances, a server, system, sub-system, or computing device can be implemented as some combination of devices that can be hosted on a common computing system, server, server pool, or cloud computing environment and share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Software system architectures can be visualized using graphical representations based on monitored transactions involving the system(s). For instance, a graphical representation of a transaction can be generated that illustrates a portion of the system's architecture as well as the flow of the transaction. Similar graphical representations can be generated for any one of several transactions monitored by a transaction analysis system. In some cases, graphical representations of flows can be combined to illustrate those flows with multiple overlapping instances to visualize scenarios of a software system. Further, scenario coverage measures can be visualized by graphically indicating which scenarios have corresponding generated test cases (and/or virtual service models), among other example features.

Software components within a system may not be single purpose in that they are capable of interfacing with potentially multiple other software components and participating in potentially multiple different transactions and transaction types. Accordingly, the same software component may appear in any one of multiple different transaction flows. Indeed, in some cases, users may conceive uses and drive interactions between systems that system designers did not anticipate. Further, some interactions and transactions may be more common than anticipated by system developers. A transaction analysis system can monitor these transactions and discover which transactions and transaction flows are most popular.

Discovering which transaction and transaction flows are the most common or critical for a software system can be utilized to improve development of the system. As an example, software development can include extensive testing of the software prior to and even following its release. Test cases can be developed, each designed to test certain aspects of a software system. Developing a sufficiently exhaustive set of test cases can be expensive and difficult. Conventionally, to determine whether a sufficient number and variety of test cases have been developed, testing engineers track code coverage of the library of test cases. In some implementations, code coverage measures the percentage (or portion) of the entire code base of the software system for which a test has been developed. In other words, each test case can be thought to test the correct functioning of a portion of the software code. When sufficient test cases have been developed to ensure that every line of the code would be tested through execution of the collection of test cases, the code coverage may be determined to be 100% or complete. Code coverage, however, may not distinguish between pieces of codes with differing levels of criticality. Further, it may not be practical or economical to achieve 100% code coverage in the library of test cases developed to test a particular software product. In some implementations, rather than (or in addition to) measuring code coverage of a set of test cases, scenario coverage can be measured to indicate the extent to which test cases have been developed to test the most used and critical transaction flows, or scenarios, of the software product.

Figure 2:
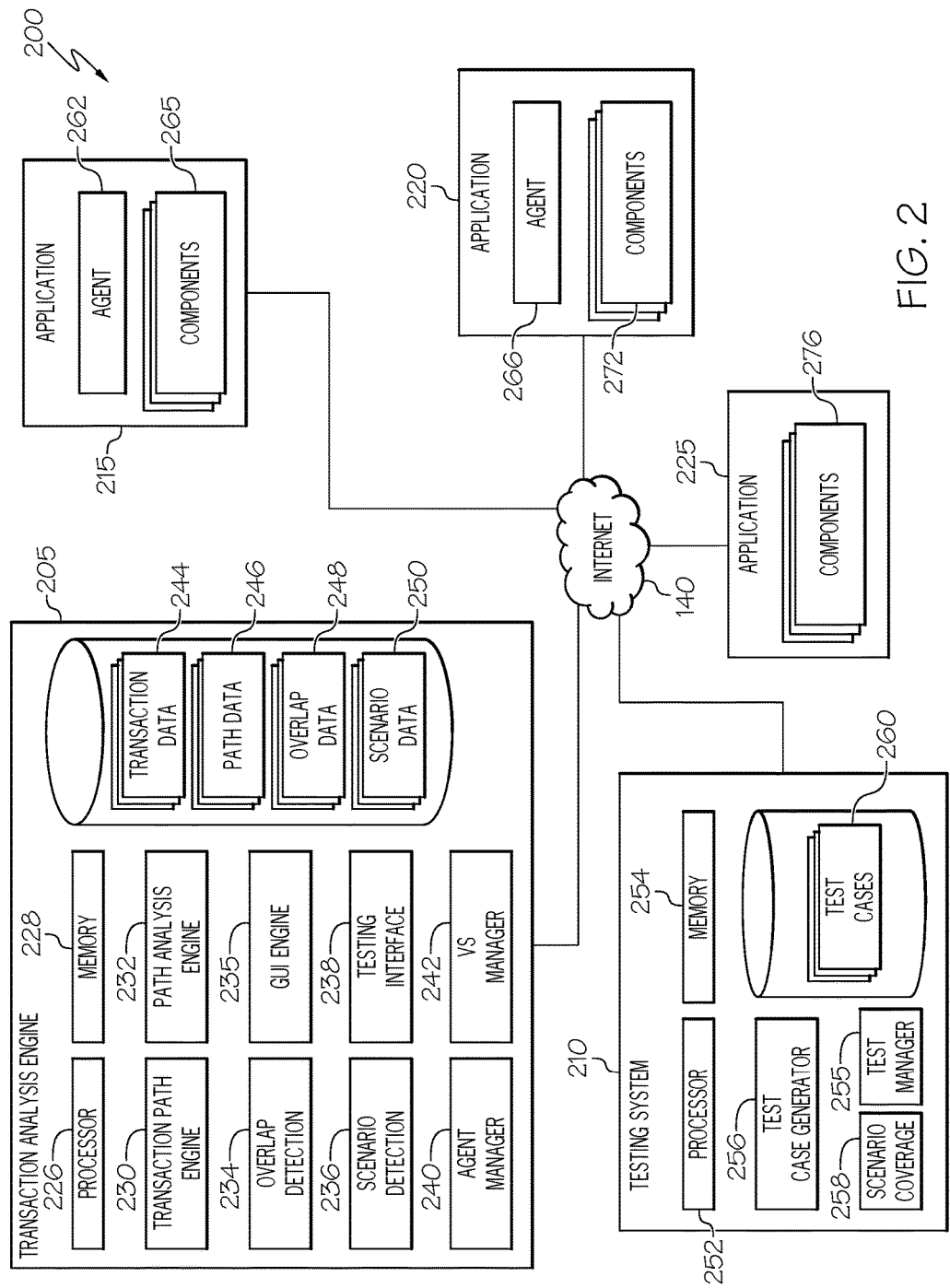
FIG. 2 is a simplified block diagram of an example computing system including an example transaction analysis system in accordance with at least one embodiment.

At least some of the systems described in the present disclosure, such as the systems of FIGS. 1 and 2, can include functionality that, in some cases, at least partially remedy or otherwise address at least some of the above-discussed issues, as well as others not explicitly described herein. For instance, tools can be provided that leverage the transaction data and transaction path information generated by a transaction analysis system 105 to identify transaction overlaps and scenarios of a particular software system to form the basis of scenario coverage measurements of a test case set developed for the system, among other example uses. For instance, turning to the example of FIG. 2, a simplified block diagram 200 is shown illustrating an example environment 200 including a transaction analysis engine 205, a testing system 210, and one or more services, database management systems, programs, or applications (referred to in this example collectively as "applications"). The systems 205, 210, 215, 220, 225, etc. can interact, for instance, over one or more networks 140. In one example implementation, a transaction analysis engine 205 can include one or more processor devices (e.g., 226) and one or more memory elements (e.g., 228) for use in executing one or more components, tools, or modules, or engines, such as a transaction path engine 230, path analysis engine 232, overlap detection engine 234, graphical user interface (GUI) engine 235, scenario detection engine 236, testing system interface 238, agent manager 240, virtual service manager 242, among other potential tools and components including combinations or further compartmentalization of the foregoing. In some implementations, transaction analysis engine 205 can be implemented as multiple different systems including, for example, varying combinations of the foregoing components and tools (e.g., 230, 232, 234, 235, 236, 238, 240, 242, etc.) and accompanying data (e.g., 244, 246, 248, 248). In other implementations, at least a portion of the functionality and modules of transaction analysis engine 205 can be integrated with other systems, such as testing system 210, a virtual service system, other development and operations (DevOps), among other examples. In one example, a testing system 210 can itself include one or more data processing apparatus (e.g., 252), one or more memory elements (e.g., 254), and components implemented in hardware and/or software including a test manager 255, test case generator 256, and scenario coverage calculator 258, among other additional or alternative components.

In one example, transaction analysis engine 205 can include a transaction path engine 230 configured to inspect a particular application (e.g., 215, 220, 225) or combination of co-functioning applications (e.g., 215 and 220) to identify one or more transactions involving the application(s) as well as the respective software components (e.g., 265, 272, 276) of the applications (e.g., 215, 220, 225) invoked and utilized within the transaction. Information gathered from monitoring or inspection of the transaction can be stored in transaction data 244. Further, the flow path of the transactions can additionally be identified and flow path data 246 can be generated (e.g., using transaction path engine 230) describing the flow between software components (e.g., 265, 272, 276) and the respective contributions, operations, processes, or transaction fragments of the applications within the flow.

In some implementations, transaction path engine 230 can operate cooperatively with an agent manager 240 interfacing with or otherwise managing one or more instrumentation agents (or "agents") (e.g., 262, 266) deployed on one or more applications (e.g., 215, 220) for use in aiding the monitoring of performance of various components (e.g., 265, 272) of the applications. Agents (e.g., 262, 266) can be software-implemented agents that are configured to provide visibility into the operations of one or more software component (e.g., 265, 272, etc.). Each agent can be configured, for example, to detect requests and responses being sent to and from the component or application in which that agent is embedded. Each agent (e.g., 262, 266) can be further configured to generate information about the detected requests and/or responses and to report that information to other services and tools, such as agent manager 240, virtualization system (not shown), transaction path engine 230, test system 210, etc. Such information can be embodied as agent data. Additionally, each agent can be configured to detect and report on activity that occurs internal to the components in which the instrumentation agent is embedded or which the agent otherwise is capable monitoring. Agents can be implemented in a variety of ways, including instrumenting each component with a corresponding agent, instrumenting an application or other collection of the software components with a single, shared agent, among other examples.

In response to detecting a request, response, and/or other activity to be monitored, each agent (e.g., 262, 266) can be configured to detect one or more characteristics associated with that activity and/or the monitoring of that activity by the agent. The characteristics can include a frame identifier, which identifies a message, with respect to the agent, sent by the instrumentation agent to a managing service, such as agent manager 240 to report the characteristics observed by the agent. For instance, frames can include a parent identifier, which identifies the requester that generated the request sent to the component or sub-component monitored by the instrumentation agent; a transaction identifier, identifying the transaction, with respect to the component or sub-component being monitored, such as transactions between components carried out through communications and calls made over one or more network connections; and an agent identifier that identifies the agent, with respect to the other instrumentation agents in the testing system, that is generating the characteristics, among other characteristics. Such characteristics can include other information such as a system clock value, current processor and/or memory usage, contents of the request, contents of the response to the request, identity of the requester that generated the request, identity of the responder generating the response to the request, Java virtual machine (JVM) statistics, standard query language (SQL) queries (SQLs), number of database rows returned in a response, logging information (e.g., messages logged in response to a request and/or response), error messages, simple object access protocol (SOAP) requests, values generated by the component that includes the instrumentation agent but that are not returned in the response to the request, web service invocations, method invocations (such as Enterprise Java Beans (EJB) method invocations), entity lifecycle events (such as EJB entity lifecycle events), heap sizing, identification of network connections involved in transactions, identification of messages and data exchanged between components, including the amount of such data, and the like. Characteristics can also include the thread name of a thread processing the request to generate the response and other data describing threads involved in a transaction, the class name of the class of an object invoked to process the request to generate the response, a Web Service signature used to contain the request and/or response, arguments provided as part of the request and/or response, a session identifier, an ordinal (e.g., relating to an order within a transaction), the duration of time spent processing the request and/or generating the response, state information, a local Internet Protocol (IP) address, a local port, a remote IP address, a remote port, and the like, among other examples.

As the above examples indicate, characteristic information can include information generated by the agent itself and information generated and/or processed by the component or sub-component monitored (and collected) by the agent (such as data sent or received by the component that intercepted by one or more agents). The agent can then cause information identifying those characteristics to be provided to one or more other services or tools (e.g., 230, 240, etc.) communicatively coupled to the agent. In some embodiments, each instrumentation agent collects information to form a message, also referred to herein as a frame, which describes characteristics associated with both a detected request and a detected response corresponding to that request. In such embodiments, the respective agent can wait for the response corresponding to the request to be generated and sent before sending the frame to another tool or engine (e.g., 210, 230, 232, 234, 235, 236, 238, 240, 242, etc.) making use of the information in the frame. Additionally, agents can monitor and report characteristics independently for each transaction in which its respective monitored component(s) (e.g., 265, 272, etc.) participates. In addition to monitoring the performance of a component and aggregating information about that component over one or a multitude of transactions (such that information about the performance of individual transactions can, for example, be averaged or statistically assessed based upon the observed performance of the component over the course of multiple monitored transactions), agents (e.g., 262, 266) can additionally provide characteristics that are specific to and correlated with a specific transaction. More particularly, these characteristics that are monitored and reported by the agents can be specific to and correlated with a particular request and/or response generated as a part, or fragment, of a transaction.

In some embodiments, all or some of agents (e.g., 262, 266) can be configured to perform interception and/or inspection (e.g., using the Java™ Virtual Machine Tool Interface, or JVM TI). Such an instrumentation agent can register with the appropriate application programming agent (API) associated with the component or process being monitored in order to be notified when entry and/or exit points occur. This allows the agent to detect requests and responses, as well as the characteristics of those requests and responses. In particular, this functionality can allow an agent to detect when a component begins reading and/or writing from and/or to a socket, to track how much data is accessed (e.g., read or written), obtain a copy of the data so read or written, and generate timing information (as well as information describing any other desired characteristics such as inbound/read or outbound/write identifiers) describing the time or order at which the data was read or written, among other information describing the data accessed, processed, or generated by the component.

In some instances, agents (e.g., 262, 266) can be configured to monitor individual threads by monitoring the storage used by each thread (i.e., the thread local storage for that thread), among other information. Such agents can detect when the monitored thread begins reading or writing to a thread local variable in the thread local storage. In response to detecting this access to the thread local variable, the agent can track the amount (e.g., in bytes, as tracked by incrementing a counter) of data that has been accessed, as well as the starting offset within the thread local storage to which the access takes place. In response to detecting that the thread's access to the thread local variable has ended, the instrumentation agent can use the information about the access to identify characteristics such as the time of the access, the variable being accessed, the value being accessed, network calls being made, and the like.

As noted above, in some implementations, one of the characteristics that can be collected by agents (e.g., 262, 266) can include timing information, such as a timestamp, that indicates when a particular request was received or when a particular response was generated. Such timing information can be included in transaction data 244 and be used, for instance, by transaction path engine 230, to identify that frames, including frames received from different agents, are related to the same transaction. In some implementations, timers used by agents (e.g., 262, 266) can be synchronized to assist in correlating timing information collected between multiple agents. Additionally or alternatively, flow, organization, hierarchy, or timing of a particular transaction can be identified through the generation of transaction identifiers that include characteristics collected by agents (e.g., 262, 266) for use in identifying fragments of the transaction. Such transaction identifiers, or transaction fragment identifiers, can include data collected by instrumentation agents in connection with, for example, the exchange of data, messaging, and other communications between components in the transaction, from thread jumps identified within software processes involved in the transaction, and other features of the transaction or fragments of the transaction.

In some implementations, agents (e.g., 262, 266) can be implemented by inserting a few lines of code into the software component (or the application server associated with that software component) being instrumented. Such code can be inserted into a servlet filter, SOAP filter, a web service handler, an EJB3 method call, a call to a Java Database Connectivity (JDBC) handler, and the like. For example, an agent configured to monitor an EJB can be configured as an EJB3 entity listener (e.g., to monitor entity beans) or interceptor (e.g., to monitor session beans). Some components (or their corresponding application servers) may not provide users with the ability to modify their code, and thus some instrumentation agents can be implemented externally to the component being monitored in a manner that can cause all requests and responses being sent to and/or from that component to be handled by the corresponding agent(s). For example, for an existing database, an agent can be implemented as a driver. Calling components can be configured (e.g., by manipulating a driver manager) to call the instrumentation driver instead of the database's driver. The instrumentation driver can in turn call the database's driver and cause the database's driver to return responses to the instrumentation driver. For example, in one embodiment, the identity of the "real" driver for the database can be embedded in the uniform resource locator (URL) that is passed to the instrumentation driver. In this way, the instrumentation driver can intercept all calls to the database, detect characteristics of those calls, pass the calls to the appropriate database, detect characteristics of the corresponding responses, and then return the characteristics of those calls and responses within corresponding transaction data 240, among other examples.

As requests and responses progress through one or more systems (e.g., 215, 220, 225), additional characteristic information can be captured, for instance, as transaction data 244. For example, a test, simulation, or live operation of one or more software systems (e.g., 215, 220, 225) engaged in one or more transactions can be monitored, for instance, by one or more agents (e.g., 262, 266) and the agents can capture characteristic information associated with requests in the transaction (e.g., the time at which the request was received, the sender of that request, the time at which corresponding requests were sent to a database and/or other service, etc., how much data was exchanged, the identity of the communication channel used in the request or response, and the like) and the corresponding response, and generate transaction data 244 embodying the information. In some cases, the amount and type of data collected by an agent may be dependent on the status of the application it monitors. For instance, it may be desirable (e.g., for performance, privacy, and/or security reasons) to limit the amount of data collected by an agent in a production version of an application. For instance, agents may only identify high level details of a transaction (e.g., that a generic request was sent to a first software component from a second software component) and exclude any payload or substantive content of the requests and responses exchanged during the transaction, among other examples. Further, agents, in some instances, can store at least a portion of the transaction data at the agent and can also, or alternatively, send transaction data 244 to other services and tools. In some instances, transaction data can be generated from or comprise agent data, among other examples.

In one implementation, a transaction path engine 230 can access and utilize transaction information in transaction data 240 to identify fragments of a transaction and organize transaction fragments and accompanying information describing characteristics of the fragment of a particular transaction into groups corresponding to a common transaction. For instance, transaction fragment characteristics can be correlated to group corresponding frames into groups of frames that describe a complete transaction. In some embodiments, in order to group frames, or otherwise identify relationships between frames or transaction fragments, transaction path engine 230 (or another tool) can sort the frames based upon particular characteristics, such as timing information associated with and/or included within those frames. After being sorted, the frames can be arranged in ascending or descending order, with respect to the timing information. For example, the frames can be sorted according to a timestamp indicating when each frame was generated, when one or more requests identified in each frame were generated or received, and/or when one or more responses identified in each frame were generated or received. In some embodiments, the frames can be sorted based upon multiple pieces of timing information. In other examples, frames can be sorted, for example, based on an amount of data exchanged, the identity of a particular communication channel or network connection used, addresses of the receiving and sending components, the identification of the particular agents that provided the frames, etc.

In an additional example, frames and accompanying transaction fragments can be correlated according to the amount and type of data that was received and/or generated, as detected by the agent, as well as information identifying the components or sub-components involved in the monitored activity. For example, such identity information can include information identifying the network ports (e.g., of the requester and responder), IP addresses, network information, or other features describing the communication of a request and corresponding response between a requester and responder. This information can be used to correlate or otherwise identify relationships between two different frames that have similar timing information and data amounts, for example. Identified network connections can be mapped to a particular portion, or fragment, of a transaction, and such fragments can be grouped (e.g., using the collected network connection description data) to identify particular transactions involving multiple different software components (and network connections), among other examples. In still other examples, an agent (e.g., 262) can intercept requests (i.e., before they are sent to their destination) and insert a marker or other data in the request (e.g., in a header of the request) and the marker can be re-inserted by subsequent agents (e.g., 266) to identify that each request corresponds to a common transaction flow, among other example techniques.

Within a group of frames or identified transaction fragments associated with the same transaction, transaction path engine 230 can order, or stitch, the frames to define a chain or order of transaction fragments within a given transaction or set of instances of a similar transaction. The stitching of the frames can be based on determined correlations between grouped frames (e.g., to identify parent-child relationships between given frames and their corresponding transaction fragments). The stitched frames can then define a transaction flow to allow the path, or flow, of the transaction to be followed from the start of the transaction to the end of the transaction and across a chain of potentially many different software components. Each frame can include a field that identifies that frame (e.g., a frame ID), as well as a field that identifies a parent frame (e.g., a parent frame ID). The value of each frame's parent frame ID can equal another frame's frame ID. These frame identifiers can be generated by the agents. In one embodiment, the frame identifiers can be generated from information identifying the IP address (or other addressing information) and port number used by the monitored component or sub-component, the amount of data sent or received by the monitored component during the monitored activity, and/or the instrumentation agent itself, among other information. Relationships can thereby be identified between parent frames, transaction fragments, and software components and corresponding child frames, transaction fragments, and components, to stitch these frames together, among other examples.

In addition to being able to use relationships or correlations to predict or determine a stitching or flowpath of transaction fragments, transaction path engine 230, in some instances can use the lack of correlative data reported by an agent to determine that a given frame corresponds to a transaction fragment that represents a root or leaf (e.g., beginning or end) of a particular transaction or branch of a transaction. For instance, it can be identified that no related connections (or other transaction fragments) involving a particular software component (or just a single correlation)

have been identified or reported and conclude, predictively, that the lack of further connections or other reporting data relating to the component or a flow including the component indicate that the transaction terminated at the component, among other examples. Similarly, root nodes can be predictively determined based on the absence of frames documenting an inbound connection at a particular component from which other transaction fragments (and related connections) originate, among other examples.

A transaction path engine 230 can utilize and correlate transaction data 244 (or agent data upon which transaction data is based) generated in part by one or more agents (e.g., 262, 266) to determine one or more transaction flow paths. The transaction path engine 230 can generate and maintain path data 246 describing the determined flow paths involving one or more software components (e.g., 265, 272, 276) or one or more software systems or applications (e.g., 215, 220, 225). Path data 246 can be used in a variety of applications, including testing, verification, and documentation. For instance, test cases to be used to govern and verify results of a test of a piece of software can be developed, in part, from path data corresponding to the piece of software to be tested, among other uses. Further, a path analysis engine 232 can consume path data 246 to perform additional activities and services in support of tests of software systems (e.g., 215, 220, 225), such as identifying boundaries between systems (e.g., 215, 220, 225), components (e.g., 265, 268, 272), and corresponding agents (e.g., 254, 258). Additionally, path analysis engine 232 can identify particular data (e.g., as captured in transaction data or other agent data) that is generated within transactions modeled by the path data 246 and further identify sources of the particular data as well as the path of the particular data as it traverses and is processed by other software components within a transaction before being output as a response or result of the transaction, among other examples. Path analysis engine 232 can further, in some instances, process transaction path data or other data to identify boundaries between system components and systems within a system, as well as boundaries of portions of systems monitored by a respective agent, among other examples.

Figure 5:
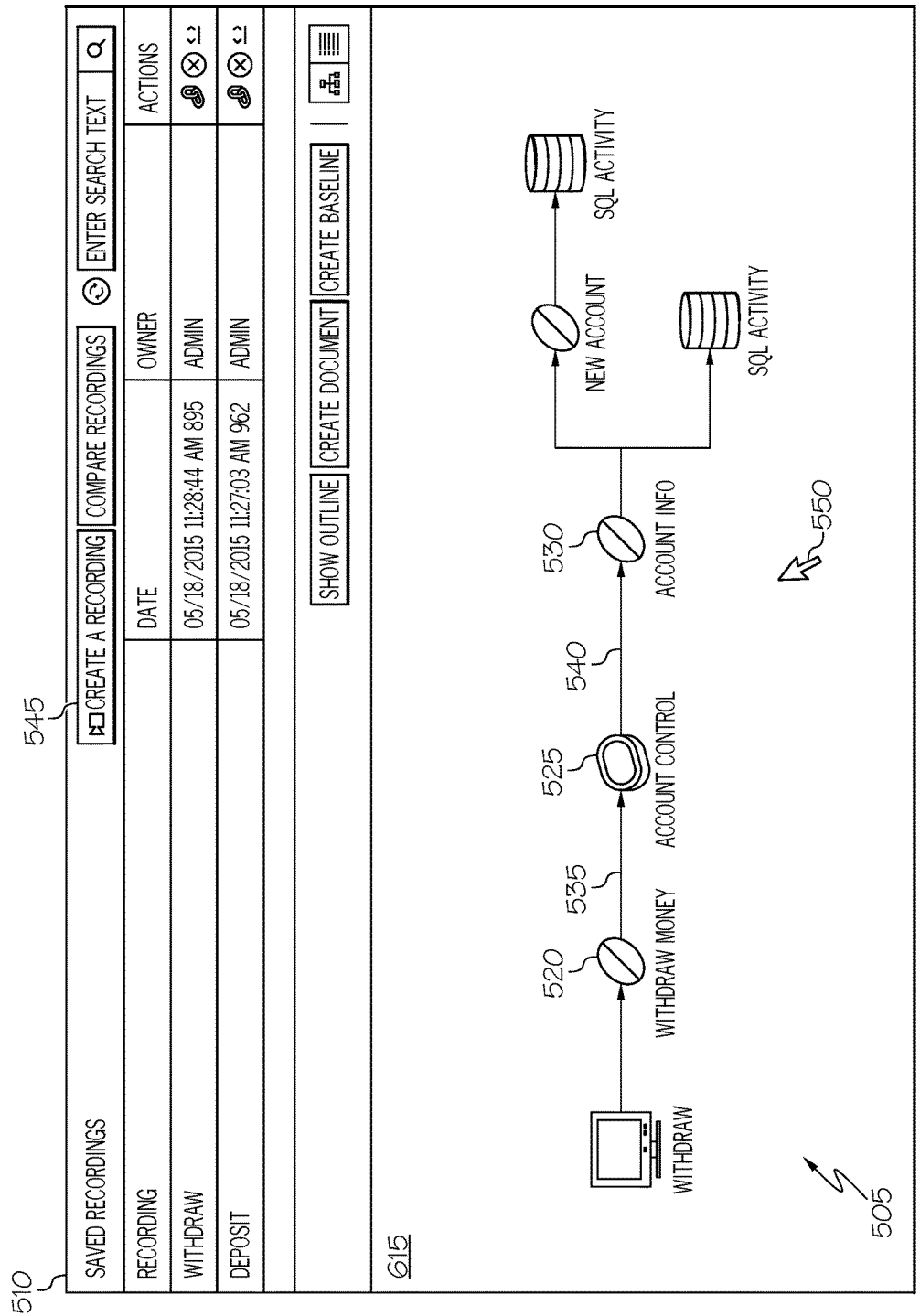
FIG. 5 is a simplified screenshot of an example graphical user interface provided in connection with a transaction analysis system in accordance with at least one embodiment.

A GUI engine 235 can access path data (and transaction data 244) and render the data to generate graphical representations (in one or more GUIs of the transaction analysis engine) of the transaction information embodied in the path and transaction data. For instance, the GUI engine 235 can be used to generate a graphical representation of the flow of a transaction. The flow can represent a single instance of an observed transaction or the aggregate of multiple observed instances of the same (or multiple different) transactions. For instance, FIG. 5 illustrates one example of a GUI 500 that can be generated using GUI engine. In the example of FIG. 5, a graphical representation 505 of a transaction "withdraw" is selected (e.g., in GUI window 510) and presented within the GUI window 515. The graphical representation 505 can include graphical blocks (e.g., 520, 525, 530, etc.) representing individual software components identified as participating in the transaction. Further, graphical lines (e.g., 535, 540, etc.) can connect two of the software component representations (e.g., 520, 525, 530, etc.), with each graphical lines (e.g., 535, 540, etc.) representing an observed transaction fragment involving a request and response between the two connected software components. As an example, in FIG. 5, the graphical representation 505 can include a representation of a transaction fragment (535) that involves a request by a withdrawMoney (Java-based) software component (represented by element 520) sent to a SOAP component accountControl (represented by element 525), which then generates and send a response to the request back to the withdrawMoney element. In this example, and in connection with generating a response to the request by withdrawMoney, the accountControl component (525) can send a request to another component (e.g., AccountInfo (530)) in another transaction fragment (540), and so on (among other examples).

GUI representations of transaction flows generated by GUI engine 235 can be interactive. A variety of information can be collected (e.g., from agents) during monitoring of transactions, including characteristics of each transaction fragment and characteristics of the software components as they are engaged in the transaction. Each of the graphical elements e.g., 520, 525, 530, 535, 540, etc.) included in the representation 505 can be interactive, allowing users to select one or more of the elements to inspect more detailed information concerning the selected software component(s) and/or transaction fragment(s). For instance, selection of a given transaction fragment element (e.g., 535) can cause the GUI to present details concerning the selected transaction fragment including the request(s) and response(s) of the fragment, values and characteristics of the request/response, the response time, the amount of data transmitted in the request and response, the type of data sent in the request and response, the type of transport mechanism used to communicate the request and response, exceptions, logged events, and other data generated in connection with the fragment, among other example characteristics. Further, selection of a given graphical representation of a software component (e.g., 520, 525, 530) can cause the GUI to display information concerning the software component including its name, type, host system, port and socket information, header information, session IDs, local and remote IP address of the component in the transaction, thread information of the component, parent IDs, supported communication protocols, the amount of memory or processing capacity used by the software component in transaction fragments participated in by the software component, exception dumps, among other example characteristics.

Returning to the example of FIG. 2, transaction analysis engine 205 can include an overlap detection engine 234 that can mine transaction data 244 and/or path data 246 to determine one or more overlaps between a set of transactions supported by a software system. In one example, an overlap detection engine 234 can search path data 246 to identify, for each software component, each transaction path in which the software component appears. The transaction paths can include instances of a same transaction or transaction type or transaction paths of different transactions and transaction types. In some cases, overlap data 248 can be generated to identify cases where a software component is detected as involved in multiple different transaction paths. An overlap detection engine 234 can additionally search the transaction path data to identify repeated transaction fragments appearing in two or more of the defined transaction paths. Detection of repeated transaction fragments in the transaction path data 246 can begin with the detection of a repeated instance of a particular software component. For each transaction path in which a particular repeated software component is identified, the path can be searched immediately upstream and downstream from the particular software component to identify whether the particular software component sends requests to or, alternatively, received requests from the same software component in each of two or more of the transaction paths in which the particular software component appears. The path can continue to be searched until the matching transaction path segments diverge.

Repeated transaction fragments or chains of fragments (or "segments") can further be identified in overlap data 248. Based on the frequency of these overlaps, recurring transaction flow paths (or portions of transaction flow paths can be identified). These overlaps can correlate to distinct instances of a common transaction flow, or use scenario. In some cases, if instances of a flow path or portion of a flow path are identified beyond a threshold frequency (e.g., during a window in which a particular system is monitored and transaction data 244 generated), the corresponding flow path can be determined (e.g., by scenario detection engine 236) to correspond to a use scenario. Scenario data 250 can be generated to catalogue the varied multiple scenarios detected for a particular software system (e.g., 215, 220, 225). Scenario data can map to or include information stored, for instance, in path data 246 and/or overlap data 248 and identify the software components included within each scenario and the respective interactions, or transaction fragments, corresponding to each pair of software components in the scenario. A scenario detection engine 236, in some instances, can additionally identify which portions of the code of the corresponding software components map to the transaction fragments (e.g., request or response processing) of a scenario and identify this mapping in scenario data 250, among other information.

In some implementations, a GUI engine 235 can additionally access scenario data 250 and incorporate information from the data 250 to enhance graphical representations of transaction flows determined by the transaction analysis engine 205. As an example, a GUI can be provided, which presents multiple graphical representations of transaction flows within a single view. In one example, each graphical representation can map to a flow of at least a portion of the set of scenarios of a particular application (e.g., 215) defined in scenario data 250. The graphical representation can be used to visualize these scenarios, and in some instances, visualize which of these scenarios have corresponding test cases (e.g., 260) and/or virtual service models generated corresponding to software components and/or transaction fragments included in the respective scenario, among other examples. Indeed, scenario coverage can be determined for a particular application based on scenario data 250.

To determine scenario coverage, in some implementations, a transaction analysis engine 205 (e.g., using scenario detection engine 236) can interface with a testing system 210 (e.g., through testing interface 238) to identify test cases (e.g., 260) that map to a particular scenario described in scenario data and determine scenario coverage provided by the test cases 260. In some instances, a scenario coverage measure can be embodied in data (e.g., generated by the transaction analysis engine 205) and can be shared with the testing system 210 to facilitate the determination (e.g., by scenario coverage calculator 258) of scenario coverage provided though the test cases (e.g., 260) for scenarios is a particular set of scenarios (e.g., the set of scenarios corresponding to a particular application). In other implementations, scenario coverage can be determined at the transaction analysis engine 205 (e.g., by querying the testing system for corresponding test cases through testing interface 238). Scenario coverage can be utilized to identify those scenarios for which no test case (or an insufficient set of test cases) has been generated. From this determination, a test case generator 256 can be utilized to generate the "missing" test cases needed to realize full scenario coverage for the set of scenarios of a particular software application, component, or system. Each of these test cases 260 can be utilized by a test manager 255 to generate inputs to a system under test simulating the inputs of a client or upstream user or system and compare the resulting response of the system under test to the expected response characteristics defined in the corresponding test case 260.

For scenario coverage based on virtual services, similar steps can be utilized. For instance, scenarios identified in scenario data 250 can be compared against a library of virtual service models to determine the portion of scenarios for which sufficient virtual service models have been generated. For instance, a transaction analysis engine 205 can further interface with a virtualization system (not shown), which includes functionality for generating and managing virtual service models, as well as instantiating virtual services from the virtual service models (e.g., to model software components during a test of a transaction (or scenario), which includes the component modeled by the virtual service). Virtual services can capture and simulate the behavior, data and performance characteristics of complete composite application environments, making them available for development and testing at the request of a user or system and throughout the software lifecycle, among other advantages. Such virtual services provide functionality beyond traditional piecemeal responders or stubs, through logic permitting the recognition of input/requests and generation of outputs/responses that are stateful, aware of time, date, and latency characteristics, support such transaction features as sessions, SSL, authentication, and support string-based and dynamic request/response pairs, among other features. Service virtualization and other virtual models can be leveraged, for instance, when live systems are not available due to project scheduling or access concerns. In cases where components have not been built yet, environments can employ virtual services to rapidly model and simulate at least some of the software components to be tested within an environment. Virtual services can be invoked and executed in a virtual environment implemented, for instance, within on-premise computing environments, in private and public cloud-based lab, using virtual machines, traditional operating systems, and other environments, among other examples. In some implementations, a virtualization system and virtual services can utilize or adopt principled described, for example, in U.S. patent application Ser. No. 13/341,650 entitled "Service Modeling and Virtualization," incorporated herein by reference in its entirety as if completely and fully set forth herein.

Figure 3:
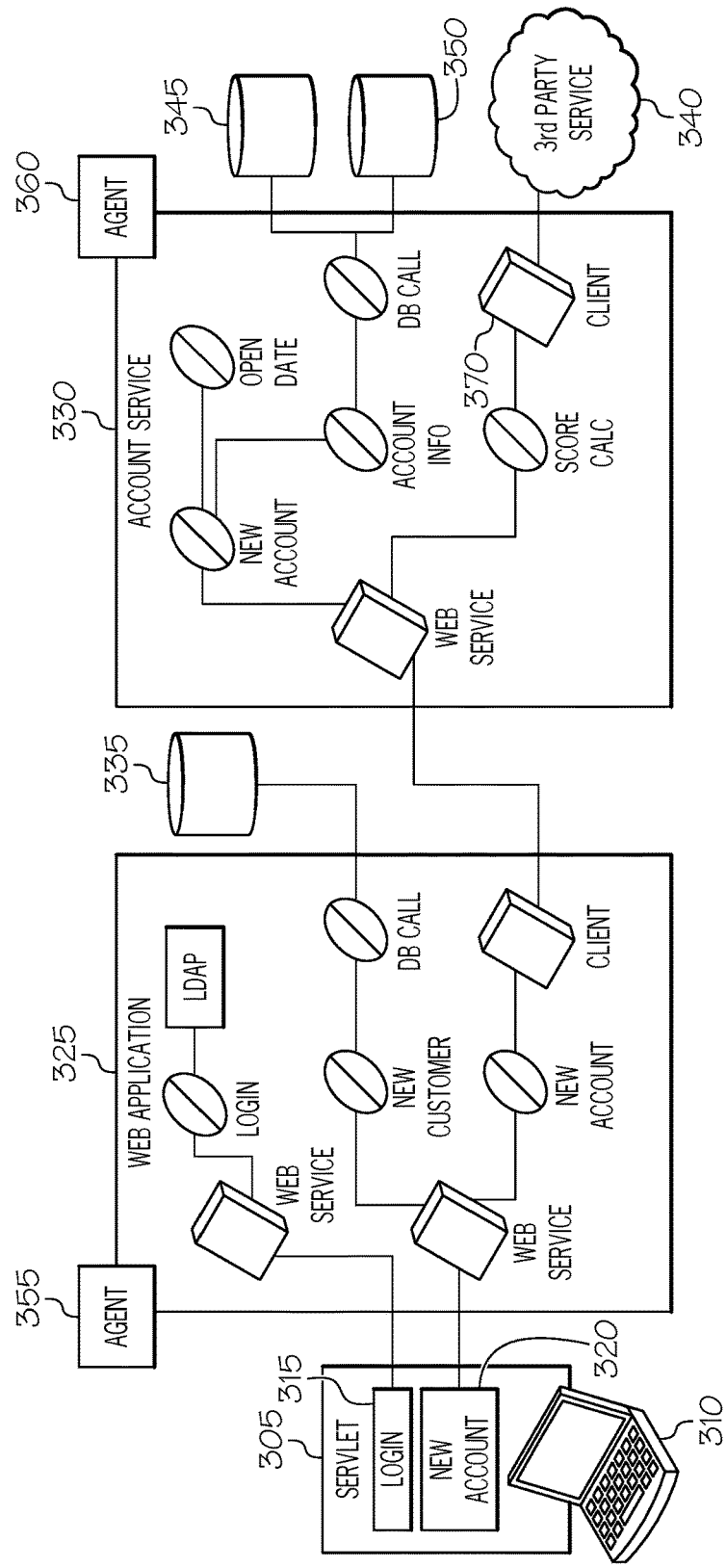
FIG. 3 is a simplified block diagram of an example system to perform one or more transactions in accordance with at least one embodiment.

Turning to FIG. 3, a simplified block diagram is shown representing example software systems and components capable of engaging in one or more transactions (e.g., illustrated in FIGS. 4A-4F) that can be monitored and modeled using the example systems and techniques disclosed herein. It should be appreciated that the example systems and transactions shown here are presented for illustrating certain general features and principles and are provided as non-limiting, simplified examples. Indeed, the features and principles discussed herein have application to a potentially limitless array of real-world systems and transactions (e.g., different from those illustrated in FIGS. 3-4F) that can likewise be monitored, analyzed, and tested in accordance with the principled outlined herein.

Figure 4A:
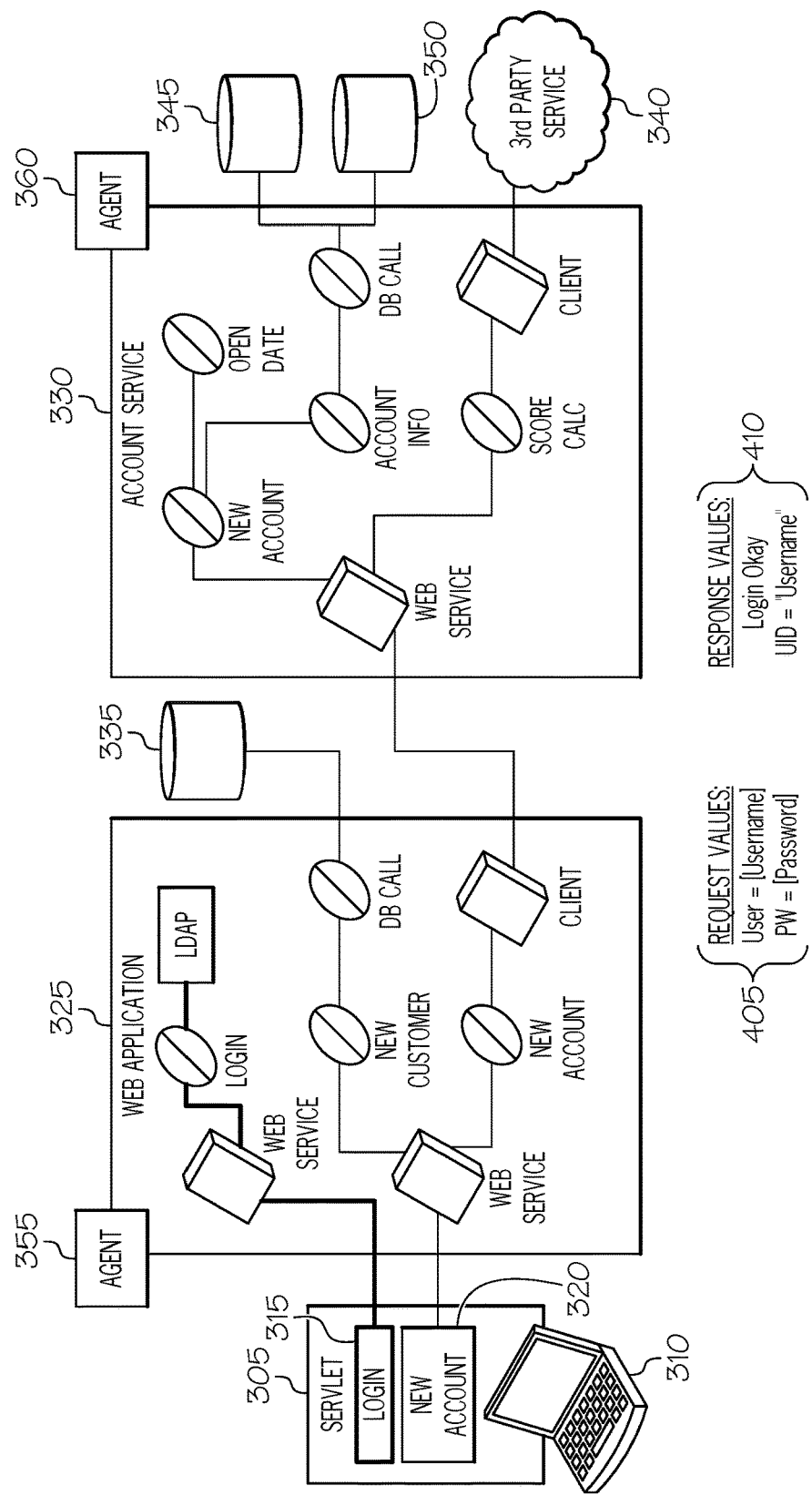
FIGS. 4A-4F are simplified block diagrams illustrating example transaction flow paths involving the example system of FIG. 3 in accordance with at least one embodiment.

In the particular example of FIG. 3, a servlet component 305 is provided as a front end for an example Login transaction 315 and New Account transaction 320 accessible to users of user computer devices (e.g., 310). The Login transaction can involve calling a web service of a web application 325 and use of a Login software component (e.g., implemented in this particular example as JavaBean software components) and Lightweight Directory Access Protocol (LDAP) system to facilitate the logging-in of a user into an account of the web application 325. FIG. 4A illustrates the flow path of the example Login transaction 315 as well as example request values 405 of the Login transaction together with example response values 410 returned in the transaction in response to the request values 405. For instance, Login transaction can include a user-provided username and password pair (provided through servlet 305) resulting in a Login Okay response value when the provided username-password pair matches the username-password pair of an existing account managed by the LDAP system of web application 325. Further, the identity of the username can also be returned, for instance, in a welcome message identifying the username.

Figure 4B:
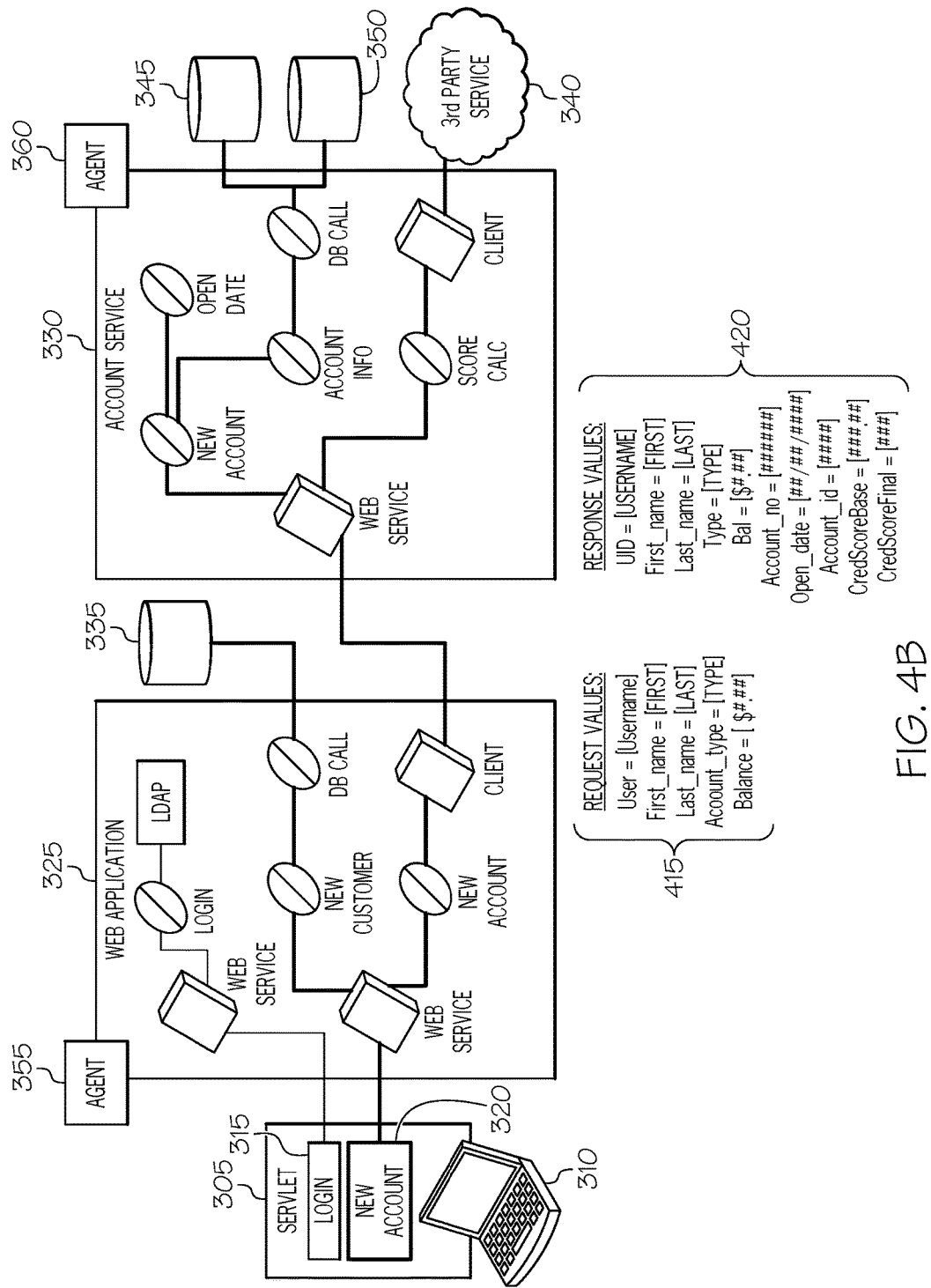

Returning to FIG. 3, additional transactions can be provided and identified. For instance, the New Account transaction 325 can support the creation and storage of a new account, such as an account for an ecommerce, banking, media subscription, or other application or service. For instance, as shown in the example of FIG. 4B, a more complex flow path can be identified for the New Account transaction 325 including multiple branches in the flow path. For example, upon creation of a new account (using New Account transaction 325) corresponding account information can be entered into a database 335 maintained outside of web application 325 and account service 330. The account information can be generated by one or more software components, such as by software components of account service 330, database 345, third party service 340, or other services and entities. New Account transaction can accept inputs or request values 415, such as username, first name, last name, account type, and account balance (e.g., for a loan, bank, e-payment, or other financial account). These request values 415, when processed in the transaction, can cause the retrieval, generation, and return of response values 420 including response values (such as values corresponding to user ID, first name, last name, account type, and balance) that are at least partially dependent or predictable based on values of the request values 415, as well as additional response values (such as values of an account number, account open date, account ID, credit score, etc.) that are not derived from or based on any of the request values 415.

The flow paths of each respective transaction involving a particular software component or system can be represented in transaction path data generated, for instance, using a transaction path engine. Transaction path data can be generated by grouping and correlating transaction fragment information included in transaction data and/or agent data captured and generated by one or more agents 355, 360 deployed on the software components and/or systems involved in the transactions, as illustrated in the example of FIG. 3. Some software components, such as third party service 340, may be unmanaged in that they are not instrumented with agents under the control of or otherwise accessible to a transaction path engine, test engine, or other tool or entity monitoring the transaction. The involvement and functionality of such unmanaged software components may remain unknown to the tools utilized in the development of transaction paths and tests of a particular transaction, and can be effectively regarded as a black box within the transaction that accepts certain monitored requests and returns corresponding responses captured, in some instances, by the agent (e.g., 360) of a neighboring monitored software component (e.g., SOAP client 370) receiving the response value from the unmonitored component (e.g., third party service 340), among other examples.

Figure 4C:
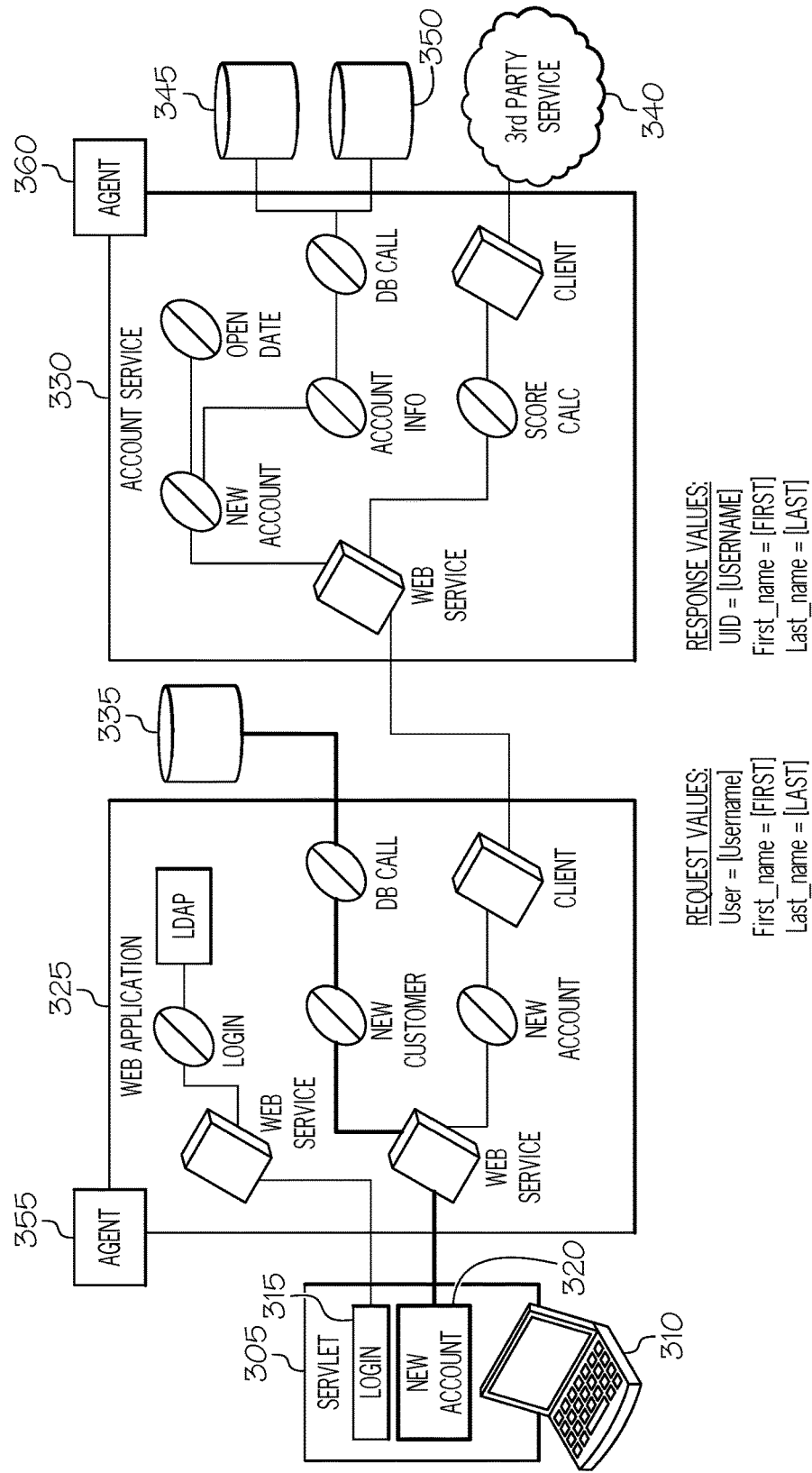

In some implementations, a single transaction can include the generation, communication, and use of multiple different response values. The generation and processing of various data within a transaction can involve the transmission of request values and response values to multiple different software components along multiple different sub-paths, or branches, of the transaction flow path. For example, FIG. 4C shows an example of a first branch of a transaction flow path shown bolded in FIG. 4B. The flow path branch of FIG. 4C shows a path for generating and storing a response value in database 335. For example, a response value can be generated or communicated by a New Customer software component for a new customer record utilizing other account information generated in the transaction. Response values such as UID, First_name, and Last_name may be provided from or generated by a New Customer software component or from a database call of database 335, among other examples. The actual values of UID, First_name, and Last_name, in some examples, can be obtained from request values provided by a user, such as the request values User, First_name, and Last_name. In some examples, proper operation of the New Customer software component may be evidenced by the generation of response values UID, First_name, and Last_name that echo request values User, First_name, and Last_name, among other examples.

Figure 4D:
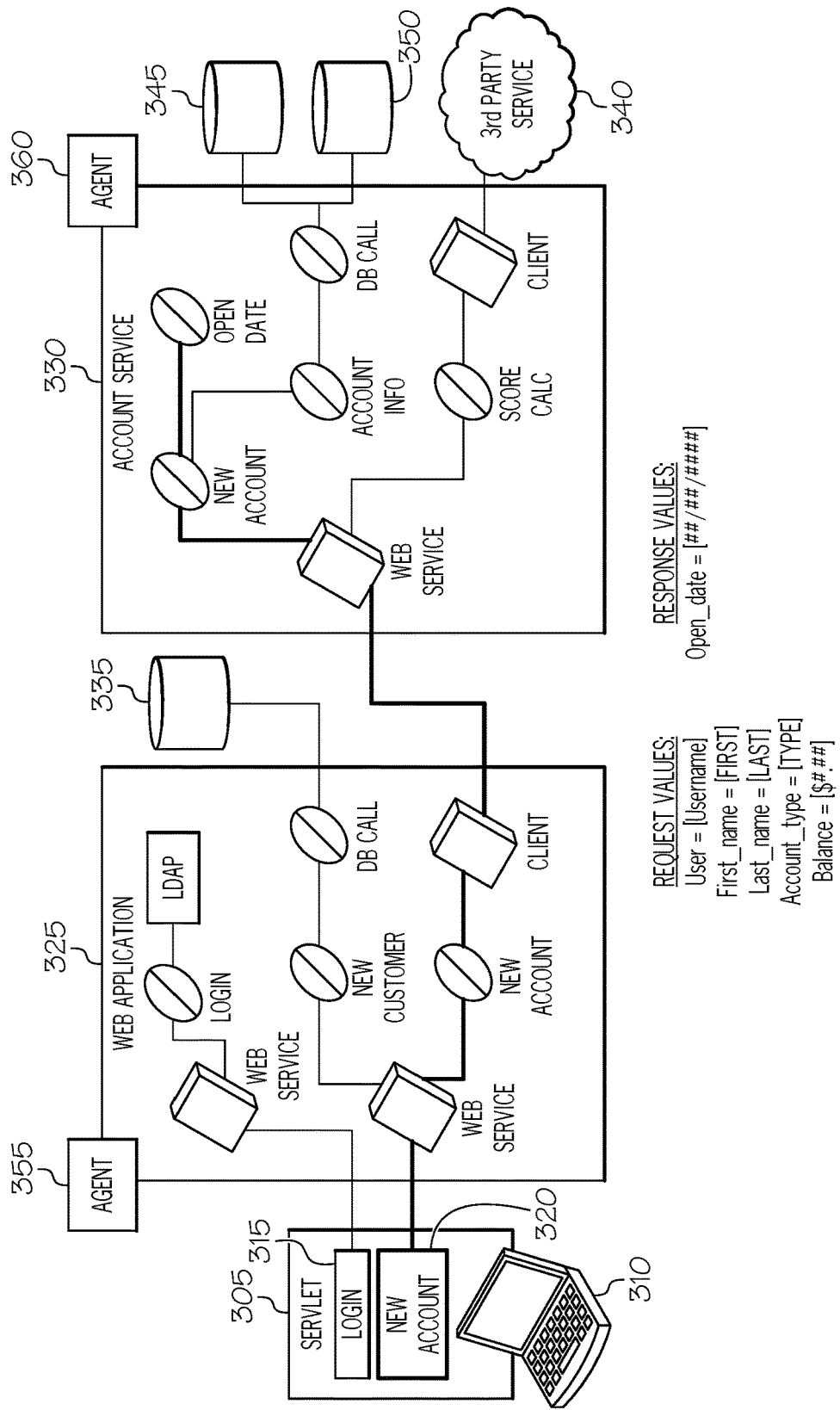

FIG. 4D illustrates another branch of an example New Account transaction, such as the New Account transaction introduced in the example of FIG. 4B. An account open date (e.g., Open_date) can be one of the response values returned in connection with the New Account transaction. In one example, an Open Date software component can include the logic for generating an account open date to be associated with a record to be provided to database 335 corresponding to the opening of the new account in connection with the New Account transaction. The account Open_date value can be generated by the Open Date component in response to a call from a New Account component of account service 330. The New Account component can additionally manage the generation of additional account data, such as by the Account Info component. The New Account component can be called through a web service call (such as a SOAP call) from web application 325 to account service 330 triggered by a New Account component at web application 325. Accordingly, as shown in the example of FIG. 4D, the invocation of an Open Date software component object can be triggered through a series of calls originating at servlet 305 and the response value Open_date can be generated and passed back from the Open Date component as a response over the same transaction flow path branch to be returned to servlet 305. The value of Open_date can be passed and reappear at each of the components upstream (i.e., in the direction of the flow path toward the software component originating the transaction request (e.g., servlet 305)). The Open Date software component can be identified as the source of the Open_date response value based on an identification of the Open Date component as a leaf in the transaction flow path branch corresponding to the Open_date response value. The Open Date software component can be identified as the leaf of the transaction flow path branch based on, for example, transaction data illustrating that the Open Date software component has no children components but is, instead, only a child component of other components with respect to the Open_date response value and the corresponding transaction path branch, among other examples.

Figure 4E:
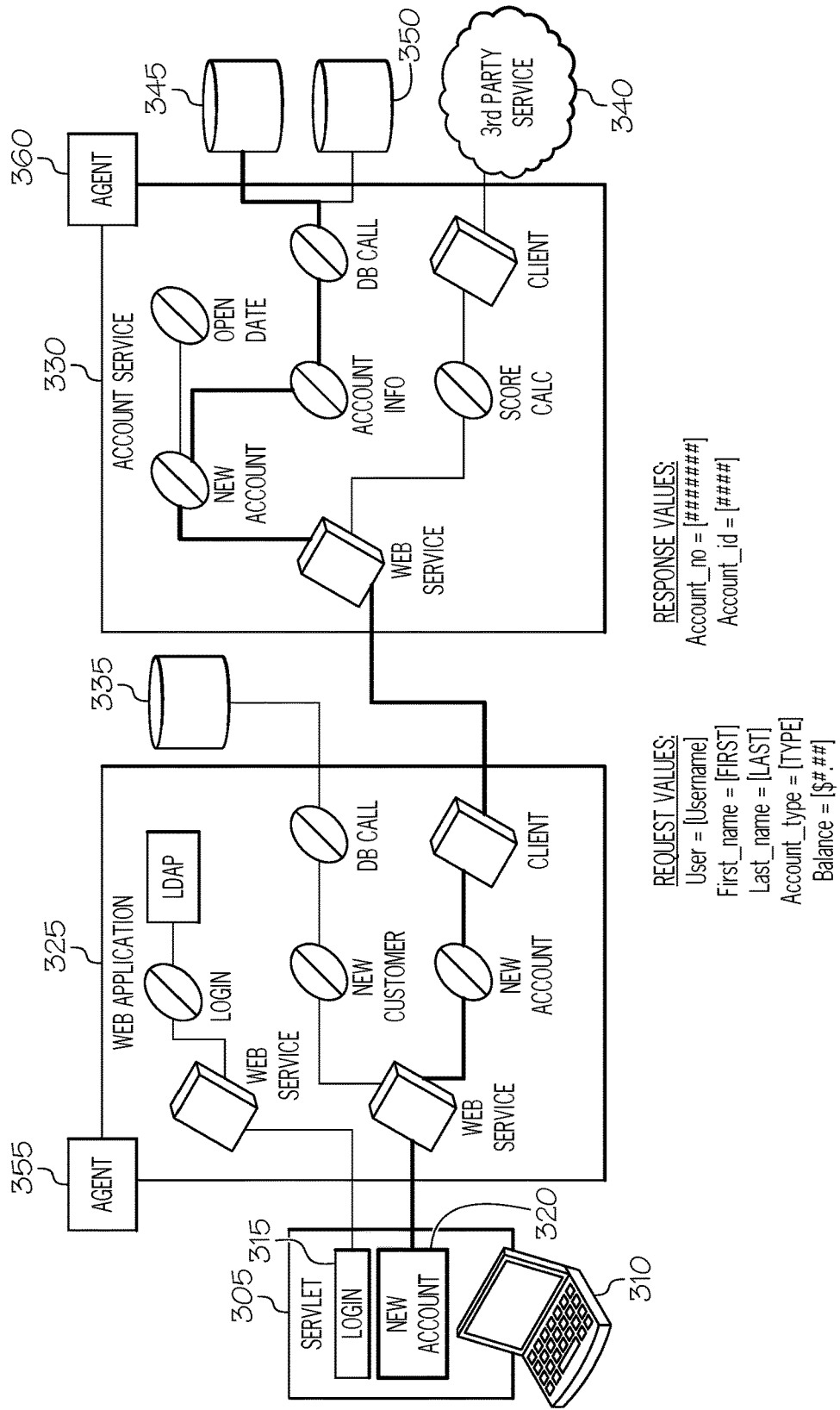

The example of FIG. 4E illustrates another example transaction flow path branch, in this case, relating to the chain of requests resulting in the generation of response values Account_no (e.g., providing the new account number generated for the account) and Account_id (e.g., corresponding to a database record for the new account), generated, for instance, by an unmonitored software component, such as database 345 or other data store, external to monitored software systems 325, 330, among other examples. The values of Account_no and Account_id, as with Open_date, may be independent of the request values provided in the transaction and involve calls by software components across application boundaries and networks connecting two disparate applications (e.g., 325, 330). For instance, the New Account software component of web application 325 may call the New Account software object of account service 330 using a web service call. An Account Info software component of account service 330 may in turn be called to generate values for the new account. For example, a database component 345 may include logic for auto-incrementing account number values (e.g., Account_no) for each new record that is added to the database 345. It can be identified that a database call was made to database 345 and that such a database call is a leaf of the transaction path branch. Further, it can be identified that the database 345 is the source of a particular value, such as in the example of FIG. 4E. Although the database 345 is not monitored by an agent, in some implementations, a transaction path engine or other tool can recognize certain types of calls to external components, such as SQL database calls, inverted list database calls, virtual storage access method (VSAM) calls, indexed sequential access method (ISAM) calls, flat file queries, and cache database calls, among other examples. Through such types of calls, the transaction path engine can make certain assumptions about the nature and operation of the external component. For instance, in the example of FIG. 4E, in instances of a SQL call to component 345, the SQL call can be identified, by an agent 350, and interpreted to conclude that component 345 is a database and the source of the value returned in response to the SQL call, among other examples. For instance, other types of calls can be used to implicitly identify the general character of a software component generating or returning a particular value in a transaction.

Figure 4F:
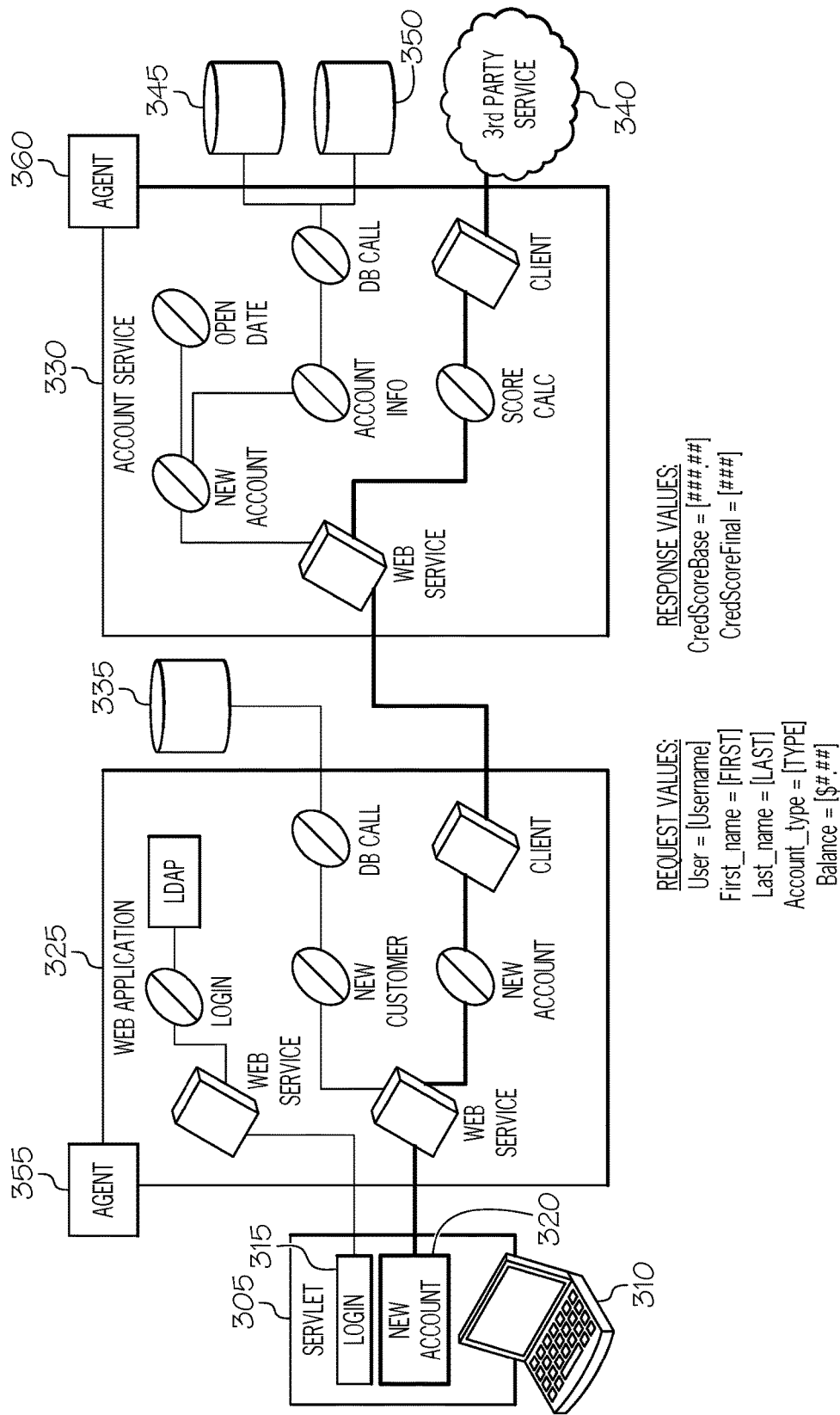

FIG. 4F illustrates another example transaction path branch involving a call to an unmonitored third party service 340. Transaction data collected or generated by agents 355, 360 can be processed to create transaction path data that can be analyzed to identify that a CredScoreBase value is returned from a third party service 340 and that the CredScoreBase value is utilized by a Score Calc software component to generate a CredScoreFinal value. Accordingly, an analysis of the corresponding transaction path data can result in the identification of the third party service 340 as the source of the CredScoreBase value and the Score Calc component of the account service 330 as the source of the CredScoreFinal value. As the third party service 340, in this example, is unmanaged, agents 355, 360 used to monitor the transaction are left without intelligence regarding how the CredScoreBase value is generated within the third party service 340, whether other external services are called in connection with the generation of the CredScoreBase value by the third party service 340, and so on. On the other hand, the agent 360 monitoring Score Calc component can identify with precision that the CredScoreFinal value was generated by the Score Calc component based on a CredScoreBase value returned from the unknown third party service 340. Further, agent 360 can capture the value returned by third party service 340 through monitoring of web service client 370, Score Calc component, etc.

Returning to FIG. 5, as introduced above, a graphical representation (e.g., 505) of a transaction path can be generated from a previously monitored, or recorded, transaction (e.g., by selecting from saved recordings in window 510). In other instances, a graphical representation 505 of a transaction path can be generated in response to a newly launched and monitored transaction. For instance, by selecting controls (e.g., 545) provided in the GUI, a new recording can be made. Creating a recording can involve selecting a known transaction capable of being performed by a particular system or by selecting to record all transaction of the particular system (or a selected portion of the particular system) during a period of time. Launching one or more transactions or passively recording operation of the system can result in the generation of new transaction data describing interactions of the software components engaged during the recording, or monitoring, session. Corresponding transaction path (and overlap) data can be generated from the recordings. Further, in response to either the selection of a saved recording (e.g., through interaction with window 510 using a cursor (e.g., 550)) or creation of a new recording (e.g., through control 545), any transaction flows determined from the recordings can be automatically output as graphical flow representations (e.g., 505) presented to the user in the GUI (e.g., in window 515). As noted above, while the example of FIG. 5 shows a graphical representation 505 of a single transaction, potentially multiple graphical representations can be presented in the window 515 in response to a request. For instance, a request to record general operation of a software system (or traffic on one or more sockets of the software system) can result in the recording of multiple transactions leading to the automatic generation of multiple transaction flow representations within the GUI. These multiple transaction flows can be processed and filtered to only show those unique transaction flows (e.g., consolidating repeated instances of the same transaction flow into a single graphical representation), or to show a set of scenarios of an application determined from the collection of transactions detected during the recording, among other examples.

Figure 6:
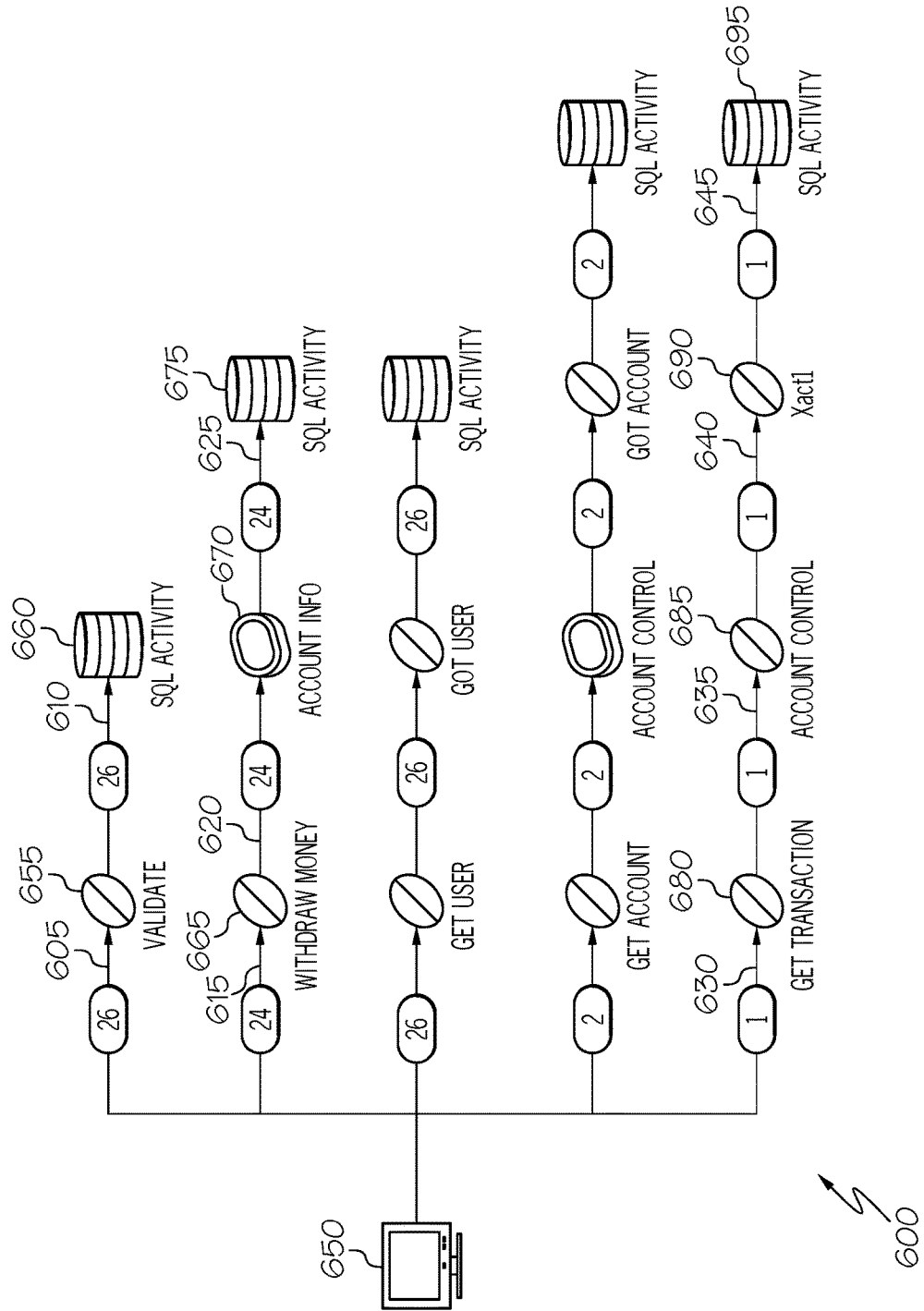
FIG. 6 is a simplified diagram illustrating the determination of recurring instances of transaction flows as determined by a transaction analysis system in accordance with at least one embodiment.

Turning to FIG. 6, a diagram 600 is shown illustrating a graphical representation of a set of distinct transaction flows detected during monitoring of a particular software system. Each transaction flow can be include transaction fragments (e.g., 605-645), involving a request-response interaction between two corresponding software components (e.g., 650-695). Each distinct transaction flow path can be identified (e.g., by a transaction analysis system from flow path overlaps determined between the individual transaction) and the frequency of each transaction flow path's occurrence can be determined. For instance, as illustrated in FIG. 6, some transaction flow paths (e.g., involving fragments 605, 610) can be more popular than others (e.g., a transaction flow path including fragments 630, 635, 640, 645). For instance, in the specific example of FIG. 6, transaction fragments 605 and 610 are determined to each appear within transaction data 26 times, while transaction fragments 630, 635, 640, 645 appear a single time. A transaction flow path that occurs with a frequency beyond a certain statistical significance or threshold can be determined to constitute a use scenario, or scenario, of the software system (e.g., a system including software components 650-695). As a simplified illustration, in the example of FIG. 6, scenarios may be defined to be transaction flows with 20 or more occurrences, while transaction flows with fewer occurrences are excluded from the scenario set for the system. It should be appreciated that other example thresholds and transaction frequency measures can be employed, including different values, rates of detection, system-specific rules, and statistical measures and algorithms forming the basis of determining whether a given transaction flow qualifies as a scenario of the system or not.

Figure 7A:
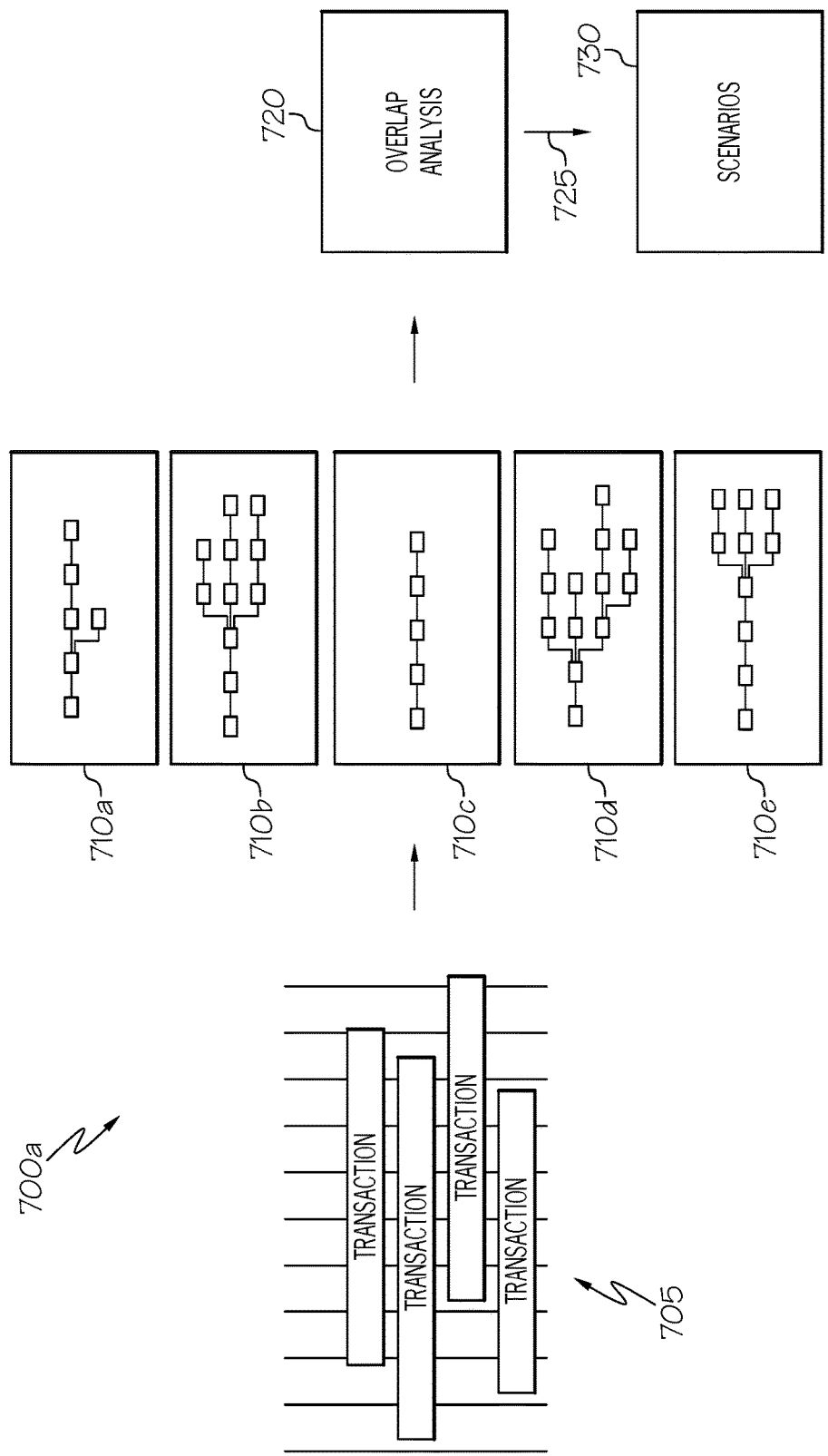
FIGS. 7A-7B are simplified block diagrams illustrating the determination of use scenarios of an example software system in accordance with at least one embodiment.
Figure 7B:
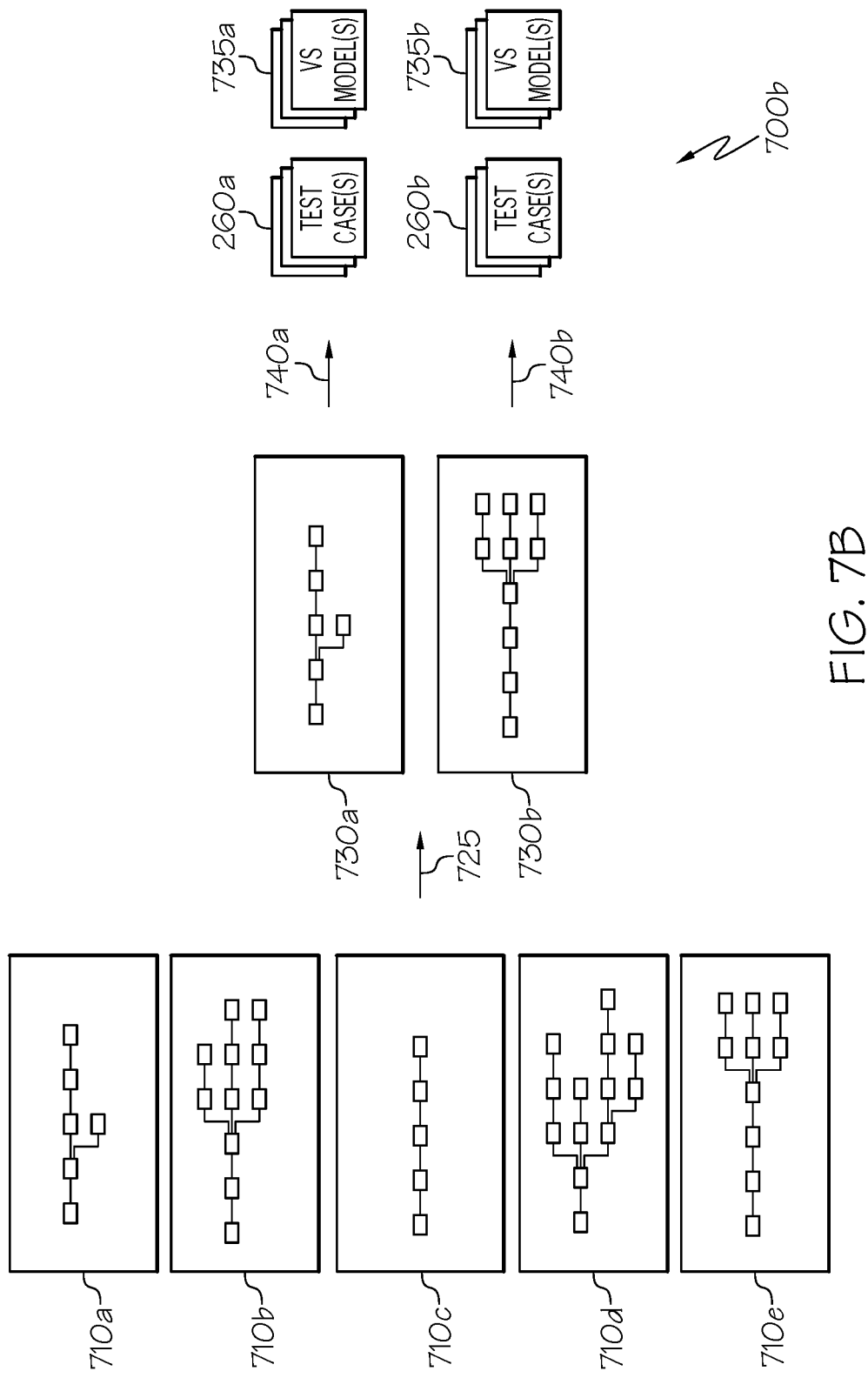

Turning to the examples of FIGS. 7A-7B, simplified block diagrams 700a-b are shown illustrating the determination of the scenarios of a software system and deriving a scenario coverage measure based on this determination. For instance, in FIG. 7A, a set of transactions 705 can be monitored (e.g., using one or more agents embedded in software components involved in the transactions or "on the wire" monitoring communications between the software components). Transaction data can be generated from the monitoring to describe characteristics of the transactions. The transaction data can describe the transactions at varying levels of detail based on whether the software system is a production or pre-production system. This transaction data can be used to determine transaction flows (e.g., 710a-e) for each transaction, illustrating how a transaction flows from a first requesting component downstream to other components involved in the transaction. An overlap analysis 720 can be conducted by a transaction analysis system to identify multiple instances of the transaction flows appearing in the monitored transactions 705 or overlaps between portions of different transaction flows. The results of the overlap analysis 720 can be used to derive (at 725) a set of use scenarios 730 for the monitored system, which identifies those transactions and flows within the system that are the most commonly used and, in a sense, most important or critical to the system's success.

Turning to FIG. 7B, the determination 725 of scenarios (e.g., 730a-b) of a system can be used to improve development, testing, and maintenance of the system. In the example of FIG. 7B, a set of scenarios (e.g., 730a-b) are determined from a set of transactions 705 monitored by a transaction analysis system (e.g., as discussed in FIG. 7A). The scenarios can be considered a kind of "checklist" for determining the sufficiency of test cases and/or virtual services developed for testing of the same system. As discussed above, scenario coverage can be calculated to express what portion of these scenarios are "covered" by test cases (e.g., 260a-b) (which can be used to simulate requests within the scenario flows and allow testing of downstream components handling the requests) and/or virtual services (e.g., 735a-b) (which can simulate responses identified within the scenario flows and allow testing of upstream, or requesting, software components within the scenario flow). Scenario coverage can serve as a substitute for, or supplement to, a code coverage measurement, which expresses what percentage of the lines of code of a system are "covered" by test cases and/or virtual services. By determining insufficient scenario coverage, "uncovered" scenarios can be identified and prompt the generation (e.g., 740a-b) of these missing test cases or virtual services. In one example, a report or service ticket can be automatically generated to identify those scenarios (as well as the component software components and transaction fragments within those scenarios) for which one or more corresponding test artifacts (i.e., a test case or virtual service) has not been developed. In other cases, such a listing of missing artifacts can be provided to an automated test generation tool capable of parsing the listing to automatically generate (i.e., without further intervention of a user) the artifacts, among other examples.

Scenario information can be used to enhance other development and management tasks for a software system. For instance, scenarios can represent the software components and transactions (and specific portions of the functionality of the software components participating in these transactions) which are most critical to the successful function of the software system. Indeed, a criticality value can be determined for one or more (or all) of the components within the system. Criticality can indicate the importance of the component within the system. Such criticality scores can be based, in part, on the number of different transactions (or transaction fragments) that use the particular software component as well as whether the particular software component is included in one (or multiple) scenarios. Additionally, some transactions may be viewed more critically than others (e.g., because they involve the accessing and changing of valuable or high security data stores, etc.) and inclusion of a software component in one of these transactions can cause the component's criticality to increase. Criticality values may be determined and can also be reflected in graphical representations of transactions. Graphical representations of overlaps within a system can be used (among other potential visualizations) to assist users in understanding the basis of a given component's criticality. Criticality can be used in other ways as well. For instance, security or risk analyses can consider criticality of a software component in connection with security and risk scores calculated for the system and used to drive related tasks.

Figure 8:
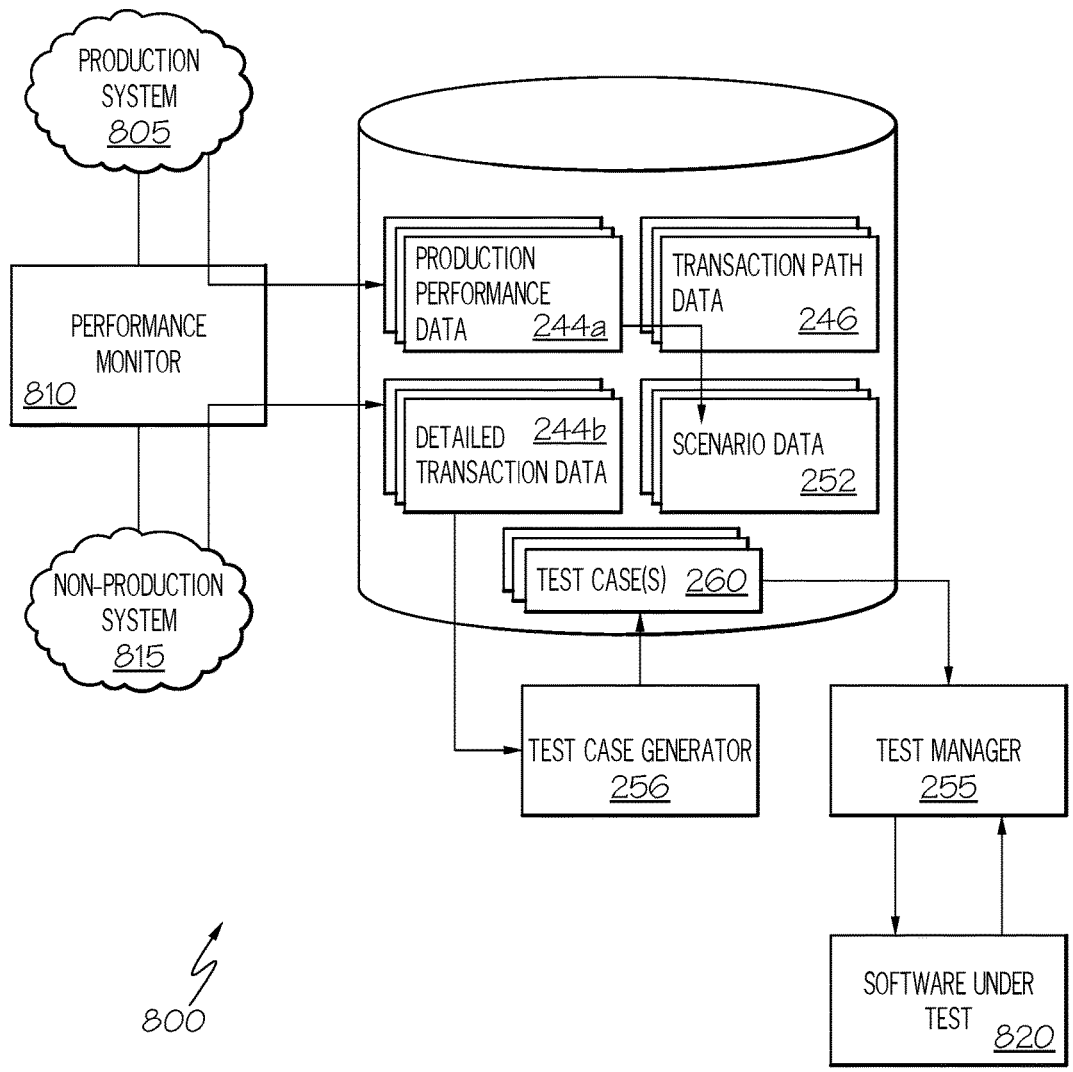
FIG. 8 is a simplified block diagram illustrating the example generation of test cases based on scenario coverage measures determined from monitoring of a production system in accordance with at least one embodiment.

Turning to FIG. 8, a simplified block diagram 800 is shown illustrating the example generation of test cases based on scenario coverage measures determined from monitoring of a production system 805 using a performance monitor 810 (e.g., provided in connection with, or integrated with a transaction analysis system). Monitoring of a production system 805 can be more sensitive than monitoring of pre-production, test, or other non-production versions 815 of the system. For instance, introducing monitoring of the content of requests and responses of a production system can introduce additional overhead negatively affecting the performance of the production system, can impinge on privacy and security concerns and policies of the production system, among other drawbacks and hurdles. Accordingly, in the some examples, such as illustrated in FIG. 8, "light" monitoring of the production system may be performed, which merely catalogues that a request or response has been sent from one component to another and further details general characteristics of the transaction fragments without viewing the content or payload of the requests/responses. For instance, production system monitoring can identify the time stamp of requests and responses, the IP addresses or ports used in the transmission of requests and responses, the size of the request or response, among other characteristics. These characteristics may nonetheless be sufficient to cross-associate transaction data describing related requests and responses, as well as to stitch together a chain of identified transaction fragments as they flow within a single transaction path. The determined transaction path for each transaction can be memorialized in corresponding transaction path data 246. The identified transactions (e.g., in the transaction path data 246) can then be further processed to determine corresponding scenarios (which can be described in scenario data 252), in accordance with the example techniques and principles described above.

As noted above, a measure of scenario coverage can be determined to identify what portion of the scenarios have a corresponding test case (e.g., 260). Opportunities to generate additional test cases 260 can be identified from the scenario coverage measure calculated from a comparison of the existing test cases and the software components and transaction fragments identified in scenario data 252. In some instances, to develop a test case 260 (or a virtual service model) based on the identification of an opportunity to generate an additional artifact from a scenario coverage measure, more intensive transaction data may be required. In one example, such as illustrated in FIG. 8, upon determining from a scenario coverage measure that insufficient test cases (or virtual services) have been generated for a particular scenario (described in scenario data 252), generation of additional test cases can involve running similar transaction flows on a non-production (or even a production) version 815 of the same software system and generating in-depth transaction data 244*b* describing the contents of requests and responses within the scenario's transaction flow. Such detailed transaction data (e.g., 244*b*) can serve the basis of generating those "missing" test cases to thereby increase scenario coverage for the system. These test cases (along with previously generated test cases) 260 can be utilized by a testing system's test manager 255 to generate simulated requests of one or more components of a system under test 820 (e.g., a new or updated version of the software system) to test whether the system under test 820 responds as expected.

Figure 9:
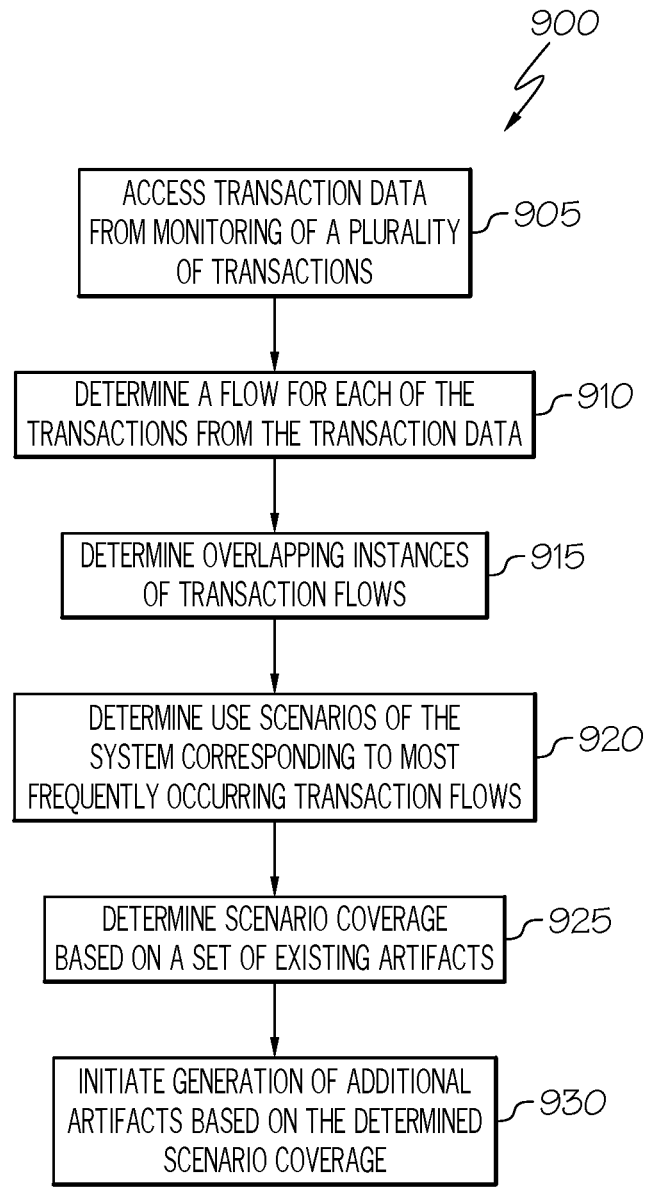
FIG. 9 is a simplified flowchart illustrating example techniques in connection with determining use scenarios of a software system in accordance with at least one embodiment.

Turning to FIG. 9, a simplified flowchart 900 is shown illustrating an example technique for determining and using scenario coverage in connection with development, testing, and maintenance of a software system. In some instances, scenario coverage measures can prove a useful metric for development teams employing continuous deployment of the system. In one example, transaction data can be accessed 905. At least some of the transaction can be accessed from a past monitoring (or "recording") as stored in computer memory (e.g., with other transaction data from past transaction recordings sessions). Other transaction data can be accessed by running and recording an instance of a transaction and generating corresponding transaction data from the recording in real time. A flow of each of the recorded transactions can be determined 910 from at least a portion of the transaction data. Determining 810 transaction flow can include generating, or detecting, transaction fragments and stitching the transaction fragments together according to a determined ordering of the fragments. Determining fragments can include determining commonalities between data sent by one component and data (i.e., the same data) received by another component. Stitching can be based on identifying relationships (from the transaction data) between one fragment and another fragment (e.g., such as the receiving of first data by a particular component in a first fragment and the sending of second data (e.g., related to the first data, for instance, by a common values occurring in content in the first and second data) by the particular component in a second fragment), among other techniques. The determined transaction flows can be assessed to identify, or determine 915, overlaps that exist between the different transactions. These overlaps can be interpreted to suggest that each flow is a separate instance of the same transaction flow or transaction flow portion.

Continuing with the example of FIG. 9, use scenarios can be determined 920 from the determined overlapping transaction flows. In one implementations, each use scenario corresponds to a corresponding one of a set of most frequently observed (or overlapping) transaction flows. The most frequently observed transaction flows can serve as a proxy for the chief uses of the system. A set of artifacts can be identified that corresponds to the system and are configured for use in testing various aspects of the system. Such artifacts can include test cases (for use in simulating client requests within the system's transactions) and virtual services (for use in simulating dependencies or system responses within the system's transactions). Such artifacts can be utilized to isolate one or more target software components within tests of the system, among other uses. A scenario coverage measure can be determined 925 to reflect the proportion of scenarios for which a corresponding type of artifact has been generated. Separate scenario coverage measures can be determined for each type of artifact (e.g., test case and virtual service model). The determine scenario coverage can indicate shortfalls in the set of artifacts, such that scenarios can be identified for which insufficient artifacts have been generated. Accordingly, based on the scenario coverage, generation of additional artifacts can be initiated 930 to address "uncovered" scenarios identified from the analysis of the transaction data (and artifact sets), among other example features and techniques.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
accessing, from computer memory, transaction data generated during monitoring of a plurality of transactions involving a plurality of software components in a system;
determining, from the transaction data using at least one data processing apparatus, a respective flow of each of the plurality of transactions, wherein the determined flows of the plurality of transactions comprise a plurality of transaction flows, each transaction flow in the plurality of transaction flows involves participation of a respective subset of the software components in the plurality of software components, and each transaction flow in the plurality of transaction flows comprises a respective plurality of transaction fragments;
determining, using at least one data processing apparatus, one or more overlapping flows between the determined flows, wherein determining an overlapping flow comprises identifying one or more common transaction fragments shared between two or more different transaction flows in the plurality of transaction flows;
detecting, using at least one data processing apparatus, a number of instances of a particular one of the one or more overlapping flows;
determining that the particular overlapping flow corresponds to a particular one of a plurality of use scenarios of the system based on the number of instances of the particular of overlapping flow; and
generating an artifact executable by a computer to simulate operation of a particular software component involved in the particular use scenario based on transaction data describing transactions involved the particular overlapping flow.

2. The method of claim 1, further comprising determining a degree to which an existing set of artifacts modeling the system correspond to the particular use scenarios, wherein the artifact is automatically generated in response to determining that the degree indicates that the existing set of artifact inadequately covers the particular use scenario.

3. The method of claim 2, wherein determining a degree to which a set of artifacts modeling the system correspond to the plurality of use scenarios comprises determining a scenario coverage measure for the system.

4. The method of claim 1, wherein the system comprises a production system and generation of the artifact comprises monitoring a non-production version of the system.

5. The method of claim 4, wherein the transaction data is generated during monitoring of transactions using the production system.

6. The method of claim 5, wherein the transaction data indicates requests and responses in transaction fragments of the plurality of transactions, but excludes contents of the requests and responses.

7. The method of claim 1, wherein the artifact comprises a test case and simulates request generation behavior of the particular software component.

8. The method of claim 7, wherein the test case is configured to generate simulated requests during a test.

9. The method of claim 8, wherein the test case is one of a plurality of test cases, and each test case in the plurality of test cases further includes information describing an expected response to a corresponding request for use in verifying performance of a system under test.

10. The method of claim 1, wherein the artifact comprises a virtual service model to model responses of the particular software component to requests generated by other software components of the system.

11. The method of claim 10, wherein the virtual service model are executable to instantiate a virtual service to generate simulated responses of the particular software component.

12. The method of claim 1, wherein the plurality of use scenarios comprise a set of most frequently observed transaction flows of the system.

13. The method of claim 1, wherein the plurality of software components are hosted on a plurality of different server devices.

14. The method of claim 1, wherein determining the flow of a particular transaction from the transaction data comprises:
determining, from the transaction data, a plurality of fragments of the particular transaction;
determining relationships between the plurality of fragments; and
stitching the plurality of fragments based on the relationships to define the flow of the particular transaction.

15. The method of claim 14, wherein each of the plurality of fragments comprises a respective request and a corresponding response to the request.

16. The method of claim 1, wherein at least a portion of the transaction data comprises data generated by an agent instrumented on a particular one of the software components and used to monitor fragments of transactions involving the particular software component.

17. A non-transitory computer readable medium having program instructions stored therein, wherein the program instructions are executable by a computer system to perform operations comprising:
accessing transaction data generated during monitoring of a plurality of transactions involving a plurality of software components in a system;
determining, from the transaction data, a respective flow of each of the plurality of transactions, wherein the determined flows of the plurality of transactions comprise a plurality of transaction flows, each transaction flow in the plurality of transaction flows involves participation of a respective subset of the software components in the plurality of software components, and each transaction flow in the plurality of transaction flows comprises a respective plurality of transaction fragments;
identifying one or more repeated flows between the determined flows, wherein determining a repeated flow comprises identifying one or more common transaction fragments shared between two or more different transaction flows in the plurality of transaction flows;
detecting a number of instances of a particular one of the one or more repeated flows;
determining that the particular repeated flow corresponds to a particular one of a plurality of use scenarios of the system based on the number of instances of the particular repeated flow; and
generating an artifact executable by a computer to simulate operation of a particular software component involved in the particular use scenario based on transaction data describing transactions involved the particular repeated flow.

18. A system comprising:
a data processing apparatus;
a memory device;
a software transaction analysis engine executable by the data processing apparatus to:
- access transaction data generated during monitoring of a plurality of transactions involving a plurality of software components in a system;
- determine, from the transaction data, a respective flow of each of the plurality of transactions, wherein the determined flows of the plurality of transactions comprise a plurality of transaction flows, and each of the flows involves participation of a respective set of software components in the plurality of software components;
- determine that a subset of the flows comprise recurring instances of a particular transaction flow;
- detecting a frequency of the recurring instances of the particular transaction flow;
- determine that the particular transaction flow is one of a set of most frequently observed transaction flows in the system based on the frequency of the recurring instances; and
- generate a test case to simulate operation of a particular one of the plurality of software components involved in at least a portion of the particular transaction flow based on determining that the set of most frequently observed transaction flows in the system comprises the particular transaction flow.

19. The system of claim 18, further comprising a test system to use the test case to generate simulated requests to a system under test, wherein the simulated requests correspond to requests in the particular transaction flow.

20. The system of claim 18, further comprising a scenario coverage calculator executable to determine a scenario coverage measure based on a percentage of the set of most frequently observed transaction flows for which a test case has been generated.

* * * * *